United States Patent
Brott et al.

(10) Patent No.: US 8,659,830 B2
(45) Date of Patent: Feb. 25, 2014

(54) OPTICAL FILMS ENABLING AUTOSTEREOSCOPY

(75) Inventors: Robert L. Brott, Woodbury, MN (US); Michael J. Sykora, New Richmond, WI (US)

(73) Assignee: 3M Innovative Properties Company, Saint Paul, MN (US)

( * ) Notice: Subject to any disclaimer, the term of this patent is extended or adjusted under 35 U.S.C. 154(b) by 485 days.

(21) Appl. No.: 12/643,503

(22) Filed: Dec. 21, 2009

(65) Prior Publication Data

US 2011/0149391 A1 Jun. 23, 2011

(51) Int. Cl.
G02B 27/22 (2006.01)
G03B 21/60 (2006.01)
F21V 7/04 (2006.01)

(52) U.S. Cl.
USPC ........... 359/463; 359/462; 359/464; 359/455; 359/458; 359/621; 362/606; 362/607

(58) Field of Classification Search
USPC .......... 359/463, 455, 457, 458, 621; 362/606, 362/607
See application file for complete search history.

(56) References Cited

U.S. PATENT DOCUMENTS

| | | | |
|---|---|---|---|
| 3,213,753 A * | 10/1965 | Rogers | 359/489.16 |
| 4,374,077 A | 2/1983 | Kerfeld | |
| 4,567,850 A | 2/1986 | Arthur | |
| 5,035,486 A * | 7/1991 | Inokuchi | 359/625 |
| 5,175,030 A | 12/1992 | Lu et al. | |
| 5,271,968 A | 12/1993 | Coyle et al. | |
| 5,558,740 A | 9/1996 | Bernard et al. | |
| 5,661,599 A * | 8/1997 | Borner | 359/463 |
| 6,310,722 B1 * | 10/2001 | Baek | 359/455 |
| 7,165,959 B2 | 1/2007 | Humlicek et al. | |
| 7,210,836 B2 * | 5/2007 | Sasagawa et al. | 362/606 |
| 7,224,529 B2 | 5/2007 | King et al. | |
| 7,530,721 B2 | 5/2009 | Mi et al. | |
| 7,750,982 B2 * | 7/2010 | Nelson et al. | 349/15 |
| 8,035,771 B2 * | 10/2011 | Brott et al. | 349/65 |
| 8,068,187 B2 * | 11/2011 | Huizinga et al. | 349/15 |
| 2005/0276071 A1 | 12/2005 | Sasagawa et al. | |
| 2007/0253058 A1 * | 11/2007 | Wood | 359/455 |
| 2008/0084518 A1 * | 4/2008 | Brott et al. | 349/65 |
| 2008/0259634 A1 | 10/2008 | Mi et al. | |
| 2008/0284945 A1 * | 11/2008 | Schultz et al. | 349/65 |
| 2009/0316058 A1 * | 12/2009 | Huizinga et al. | 349/15 |

* cited by examiner

*Primary Examiner* — Audrey Y Chang
(74) *Attorney, Agent, or Firm* — Lance L. Vietzke

(57) ABSTRACT

Optical films used for 3D autostereoscopic displays include lenses on one surface of the optical film that are registered to prisms on the opposing surface of the optical film. The lenses may be a-cylindrical lenses or cylindrical, and the rotation of the lenses can vary with position on the surface of the optical film. The prisms may be contiguous or non-contiguous. The prisms of the optical film can have a pitch that is different from a pitch of the lenses, or the prism pitch can be substantially the same as the pitch of the lenses.

15 Claims, 14 Drawing Sheets

OPTICAL FILMS ENABLING AUTOSTEREOSCOPY

BACKGROUND

Displays that provide 3D images are advancing in technology and in popularity with consumers. Stereoscopic display technologies include shutter glasses, polarized glasses, and other techniques that require the user to wear additional equipment. Autostereoscopic displays, which do not require additional equipment, are of increasing interest. One technique for achieving an autostereoscopic display involves a spatially multiplexed approach that subdivides the number of pixels in a display to left eye image pixels and right eye image pixels. This approach halves the resolution of the display, degrading the viewing experience.

Some autostereoscopic displays use an optical film with features on both sides of the optical film. These approaches involve time multiplexing of images, thus avoiding the decrease in resolution required by spatial multiplexing. However, some films have a wide stereo edge that leads to image cross talk and degrades the image observed by the viewer. The width of the stereo edge and the amount of image cross talk becomes increasingly important as the display size increases and/or the viewer's distance from the display increases.

SUMMARY

Some embodiments involve an optical film that includes a-cylindrical lenses disposed on a first surface of the optical film and prisms disposed on a second surface of the optical film. Each lens on the first surface is registered to a prism on the second surface. The prisms may be contiguous or non-contiguous. In some implementations, the prisms of the optical film have a pitch that is different from a pitch of the lenses. In other implementations, the prism pitch is substantially the same as the pitch of the lenses.

In some films, the a-cylindrical lenses are not substantially rotated, whereas in other films the a-cylindrical lenses have a rotation that varies with position on the first surface. For example, the lenses may be rotated about a rotation point that is below a vertex of the a-cylindrical lens and on a center line of the rotated a-cylindrical lens. The point of rotation may be the focal point of the lens. In some implementations, the optical film includes both positively rotated a-cylindrical lenses and negatively rotated a-cylindrical lenses. Each positively rotated a-cylindrical lens is rotated at a positive angle with respect to a center line of the positively rotated a-cylindrical lens and each negatively rotated a-cylindrical lens is rotated at a negative angle with respect to a center line of the negatively rotated a-cylindrical lens.

Some embodiments involve autostereoscopic display modules incorporating double sided optical films. The autostereoscopic display modules include a light guide having a first side, a second side opposite the first side, a first light guide surface extending between the first and second sides, and a second light guide surface opposite the first surface. The first light guide surface substantially re-directs light and the second light guide surface substantially emits light. A first light source is disposed along the first side of the light guide and a second light source is disposed along the second side the light guide. A synchronization driving element is electrically coupled to the first and second light sources and synchronizes turning each of the first or second light sources on or off in an alternating order. A double sided optical film is arranged to receive light emitted through the second surface of the light guide. The optical film includes a-cylindrical lenses disposed on a first surface of the optical film and prisms disposed on a second surface of the optical film. Each lens on the first surface of the optical film is registered to a prism on the second surface of the optical film. The a-cylindrical lenses may be rotated toward an estimated viewer position. For example, a group of first lenses may be rotated at positive angles with respect to their center lines toward an estimated viewer position. A group of second lenses may be rotated at negative angles with respect to their center lines and toward the estimated viewer position.

Another embodiment involves a double sided optical film having lenses disposed on a first surface of the optical film in registration with prisms disposed on a second surface of the optical film. A rotation of the lenses on the first surface varies with position on the first surface. The lenses may be rotated around their respective focal points. The lenses may be cylindrical or a-cylindrical. The optical film may include a group of first lenses that are rotated at positive angles with respect to their center lines and a group of second lenses rotated at negative with respect to their center lines. The prisms of the optical film may be contiguous or non-contiguous. The pitch of the prisms may be different from the lens pitch, or the prism pitch and the lens pitch may be substantially equal.

Another embodiment involves autostereoscopic display modules having optical films with lenses that have a variable rotation. The autostereoscopic display includes a light guide having a first side, a second side opposite the first side, a first light guide surface extending between the first and second sides, and a second light guide surface opposite the first surface. The first light guide surface substantially re-directs light and the second light guide surface substantially emits light. A first light source is disposed along the first side of the light guide and a second light source disposed along the second side the light guide. A synchronization driving element is electrically coupled to the first and second light sources. The synchronization driving element is configured to synchronize turning each of the first or second light sources on or off in an alternating order. A double sided optical film is arranged to receive light emitted through the second surface of the light guide. The optical film includes lenses disposed on a first surface of the optical film that are registered to prisms disposed on a second surface of the optical film. The lenses have a rotation that varies with position on the first surface of the optical film. The lenses may be cylindrical or a-cylindrical. The prisms may be contiguous or non-contiguous. In some cases, the prisms have a pitch that is different from the pitch of the lenses.

BRIEF DESCRIPTION OF THE DRAWINGS

The invention may be more completely understood in consideration of the following detailed description of various embodiments of the invention in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1A:
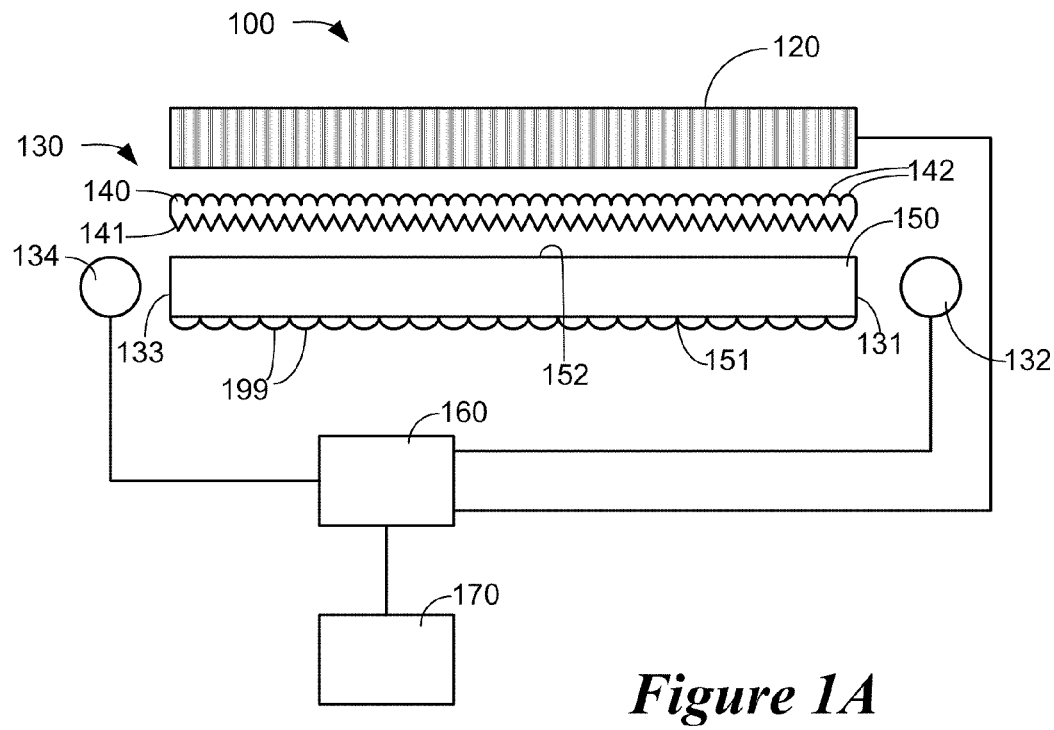
FIG. 1A is a schematic side view of an illustrative display apparatus.

In the following description, reference is made to the accompanying drawings that form a part hereof, and in which are shown by way of illustration several embodiments. It is to be understood that other embodiments are contemplated and may be made without departing from the scope of the present invention. The following detailed description, therefore, is not to be taken in a limiting sense.

The term "autostereoscopic" refers to displaying three-dimensional (3D) images that can be viewed without the use of special headgear or glasses on the part of the user or viewer. These methods produce depth perception for the viewer even though the image is produced by a flat device. The term "stereoscopic 3D" incorporates the field of autostereoscopic devices but also includes the stereoscopic 3D display case in which special headgear, typically shutter glasses, are need to see stereoscopic 3D from a flat device.

Autostereoscopic devices described herein present two images to the viewer corresponding to left and right parallactic viewpoints to simulate a three dimensional image from a two dimensional display. The left and right images are time multiplexed during a first time period and a second time period, corresponding to the left eye view and the right eye view, respectively, at a rate that is faster than the human eye can resolve. The 3D display directs the images towards the location of the viewer's left eye during the first time period and towards the location of the viewer's right eye during the second time period. Altering the directivity of the image to the left and right eye locations may be accomplished by switching between two light sources that illuminate the display.

The autostereoscopic displays described herein include double sided optical films having cylindrical or a-cylindrical lenses on one surface of the film. Each of the lenses is registered to a corresponding prism on the opposing surface of the film. A lens and its corresponding prism are referred to herein as a lens/prism pair.

In some embodiments, the configuration of the lens/prism pairs varies across the surface of the film. For example, the configuration of the lens/prism pairs may vary due to a variation in the rotation of the lenses across the surface of the film. In some implementations, the variation in the configuration of the lens/prism pairs may be due to a difference between the lens pitch and the prism pitch. When the prism pitch is different from, e.g., greater than or less than the lens pitch, the offset between the lenses and their corresponding prisms varies across the surface of the optical film.

Some double sided optical films described herein include a-cylindrical lenses on one surface of the optical film which are registered to prisms on the opposing surface of the optical film. These lens/prism pairs may not have substantial variation in their configuration across the film. For example, the pitch of the lenses may substantially equal the pitch of the prisms, the lenses may not be rotated, or may have a substantially uniform rotation so that the lens/prism pairs have a cross section that does not substantially vary with position.

An autostereoscopic display 100 according to embodiments of the invention is illustrated in FIG. 1A. The display 100 includes a display panel 120, e.g., a liquid crystal display (LCD) panel, and a backlight 130 positioned to provide light to the liquid crystal display panel 120. The backlight 130 includes one or more light guides 150, one or more right eye image light sources 132, e.g., solid state light sources, and one or more left eye image light sources 134, e.g., solid state light sources. Each of the first and second light sources 132, 134 is capable of repetitively transitioning between an OFF state, during which the light source 132, 134 produces no light output or a very small light output, and an ON state, during which the light source 132, 134 produces a significant light output, at a rate that is imperceptible to the human eye, for example, at a rate of least 30 Hz per eye or preferably at least 60 Hz per eye.

The light sources 132, 134 may be inorganic solid state light sources, e.g., light emitting diodes (LEDs) or laser diodes, and/or may be organic light emitting diodes (OLEDs). Light extraction features 199, e.g., prisms, lenticular features, white dots, haze coatings and/or other features, may be disposed on one or both surfaces 151, 152 of the light guide 150. A double sided optical film 140, as described in more detail herein, is disposed between the liquid crystal display panel 120 and the backlight 130. The double sided optical film 140 includes lenses 142 on the surface of the optical film 140 that is oriented away from the light guide 150. Each of the lenses 142 is registered to a corresponding prism 141 on the surface of the optical film 140 that is oriented toward the light guide 150. In general, dimensions for the pitch of the lenses and prisms may be determined, for example, by selecting a pitch that would result in the elimination or reduction of Moiré patterns in the display 100. The lens and prism pitches can also be determined based upon manufacturability. As LCD panels are manufactured with different pixel pitches, it can be desirable to change the pitch of the optical film to accommodate the different pixel pitches of the LCD panel. A useful pitch range for an autostereoscopic optical film 140 is about 10 microns to about 140 microns, for example.

The display 100 can have any useful shape or configuration. In many embodiments, the liquid crystal display panel 120 and/or light guide 150 have a square or rectangular shape. However, in some embodiments, either the liquid crystal display panel 120 and/or light guide 150 have more than four sides and/or have a curved shape. The surfaces 151, 152 of the light guide 150 may be substantially parallel, or the light guide 150 may be wedge-shaped. In some examples, two wedge-shaped light guides with corresponding light sources are used.

A synchronization driving element 160 is electrically connected to the right eye image and left eye image light sources 132, 134, and the liquid crystal display panel 120. The synchronization driving element 160 synchronizes activation and deactivation of the right eye image light source 132 and the left eye image light source 134 as image frames are provided to the liquid crystal display panel 120 to produce an image. The image may be a still image sequence, video stream, and/or rendered computer graphics, for example. An image source 170 is connected to the synchronization driving element 160 and provides the image frames (e.g., right eye images and left eye images) to the liquid crystal display panel 120.

The liquid crystal display panel 120 can be any useful transmissive liquid crystal display panel. In many embodiments, liquid crystal display panel 120 has a frame response time of less than 16 milliseconds, or less than 10 milliseconds, or less than 5 milliseconds, or less than 3 milliseconds. Commercially available transmissive liquid crystal display panels having an appropriate frame response time include, for example, the Toshiba Matsushita Display (TMD) optically compensated bend (OCB) mode panel LTA090A220F (Toshiba Matsushita Display Technology Co., Ltd., Japan).

The light guide 150 includes a first light input side 131 adjacent to the right eye image light source 132 and an opposing second light input side 133 adjacent to the left eye image light source 134. A first light guide surface 151 extends between the first side 131 and second side 133. A second light guide surface 152, opposite the first surface 151, extends between the first side 131 and the second side 133. Light may be reflected or emitted from either surface 151, 152 of the light guide 150, but in general light is emitted from surface 152 and is reflected from surface 151. In many embodiments, a highly reflective surface is on or adjacent to the first surface 151 to assist in re-directing light out through the second surface 152.

In some embodiments, the first light guide surface 151 includes a plurality of extraction elements 199 such as, prisms, lenticular features, white dots, haze coatings, and/or other features. The longitudinal axis of the extraction features can extend in a direction substantially parallel to the first side 131 and second side 133 or substantially parallel to the prisms and lenses of the double sided optical film 140, or the extraction features can be arranged at other angles.

The light sources 132, 134 can be any useful light source wherein the light output of each light source 132, 134 can be modulated from ON (relatively high light output) to OFF (no or negligible light output) at a rate of at least 30 Hz per eye or preferably 60 Hz or more per eye, for example. In many embodiments, the light sources 132, 134 are a plurality of LEDs, such as Nichia NSSW020B (Nichia Chemical Industries, Ltd., Japan). In some embodiments, the light sources 132, 134 comprise a plurality of laser diodes or OLEDs. The light sources 132, 134 can emit any number of visible light wavelengths such as red, blue, and/or green, or range or combinations of wavelengths to produce, for example, white light.

The light guide 150 can be a single layer of optically clear material with light sources adjacent both sides of the light guide 150 or two (or more) layers of optically clear material which preferentially extract light in a desired direction, with a light source for each layer.

The image source 170 can be any useful image source capable of providing images frames (e.g., right eye images and left eye images) such as, for example, a video source or a computer rendered graphic source. In many embodiments, the video source can provide image frames from 50 to 60 hertz or from 100 to 120 hertz or greater.

The computer rendered graphic source can provide gaming content, medical imaging content, computer aided design content, and the like. The computer rendered graphic source can include a graphics processing unit such as, for example, an Nvidia FX5200 graphics card, a Nvidia GeForce 9750 GTX graphics card or, for mobile solutions such as laptop computers, an Nvidia GeForce GO 7900 GS graphics card. The computer rendered graphic source can also incorporate appropriate stereo driver software such as, for example, OpenGL, DirectX, or Nvidia proprietary 3D stereo drivers.

The image source 170 can provide video content. The image source can include a graphics processing unit such as, for example, an Nvidia Quadro FX1400 graphics card. The video source can also incorporate appropriate stereo driver software such as, for example, OpenGL, DirectX, or Nvidia proprietary 3D stereo drivers.

The synchronization driving element 160 can include any useful driving element providing synchronizing activation and deactivation (i.e., light output modulation) of the right eye image light source 132 and the left eye image light source 134 with image frames provided at a rate of, for example, 30 Hz or preferably 60 hertz or greater to the liquid crystal display panel 120 to produce video or rendered computer graphics. The synchronization driving element 160 can include a video interface such as, for example, a Westar VP-7 video adaptor (Westar Display Technologies, Inc., St. Charles, Mo.) coupled to custom light source drive electronics.

Figure 1B:
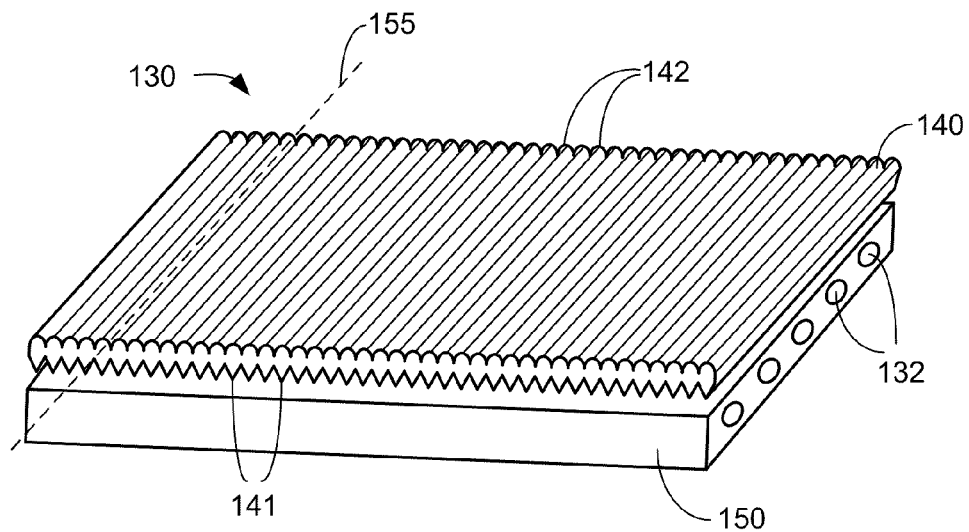
FIG. 1B is a view of the backlight of FIG. 1A.

FIG. 1B is a three dimensional diagram of the back light 130 showing the light guide 150, optical film 140 and right eye image light sources 132. The optical film 140 includes lenses 142 oriented away from the light guide 150 and prisms 141 with prism peaks oriented toward the light guide 150. A longitudinal axis 155 of a lens or prism runs substantially parallel to the vertex of the lens or prism.

Figure 2A:
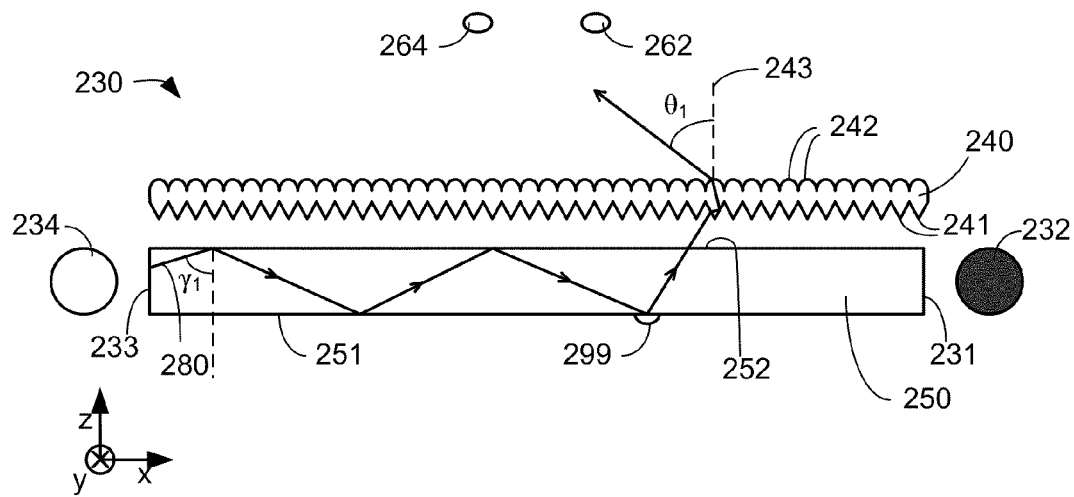
FIG. 2A illustrates the operation of the backlight when the left eye image light source is activated and the right eye image light source is deactivated.
Figure 2B:
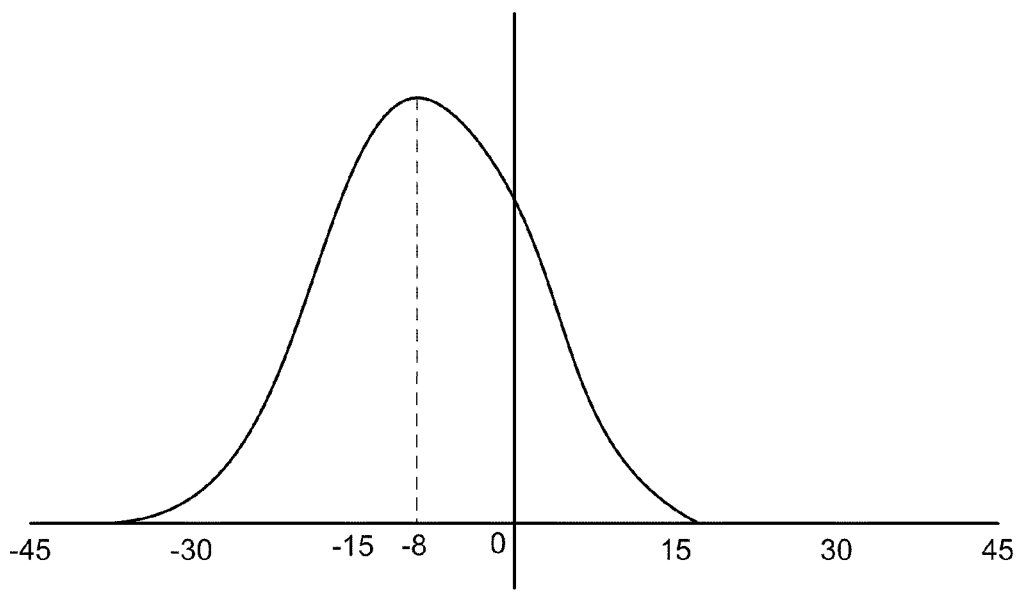
FIG. 2B is a graph of the angular light output from the backlight when the left eye image light source is activated and the right eye image light source is deactivated.
Figure 2C:
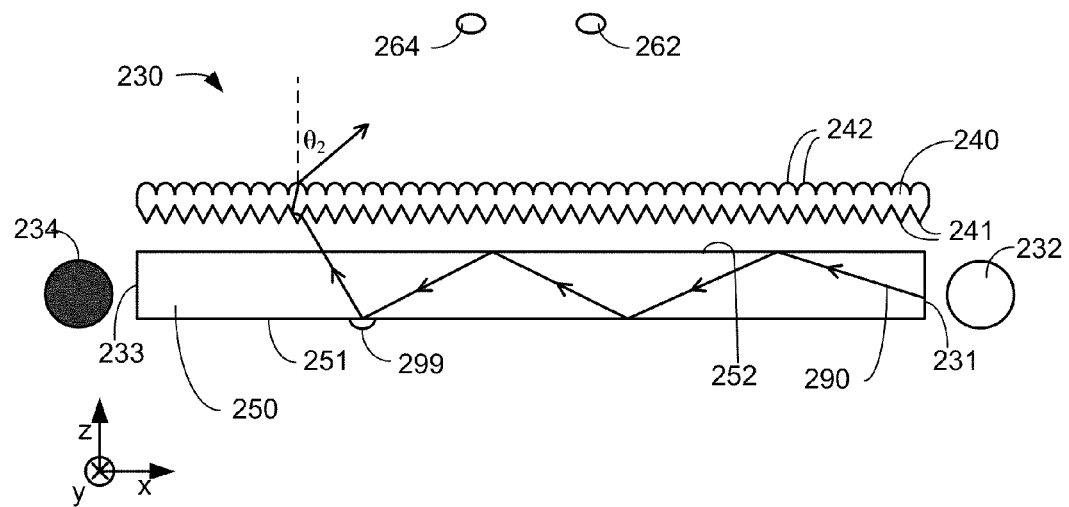
FIG. 2C illustrates the operation of the backlight when the right eye image light source is activated and the left eye image light source is deactivated.
Figure 2D:
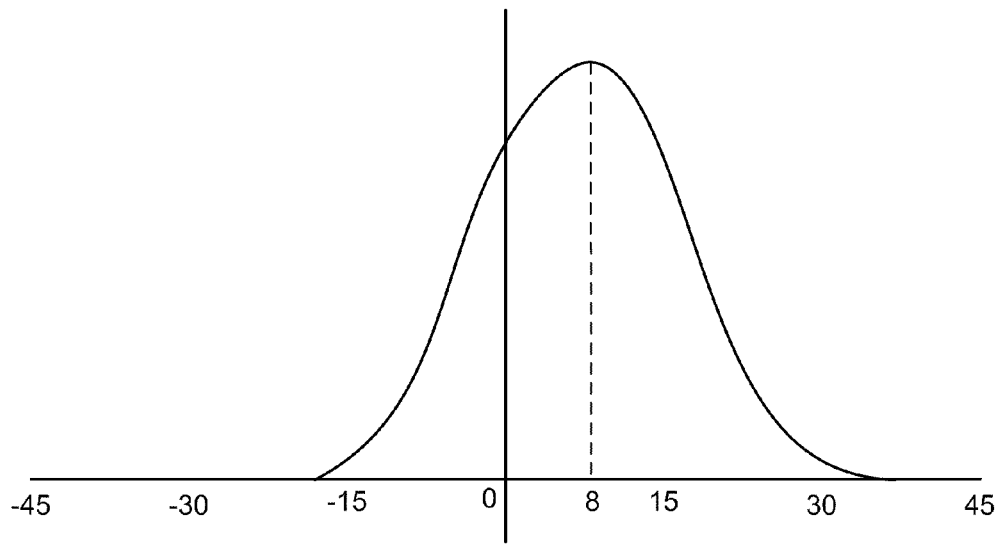
FIG. 2D is a graph of the angular light output from the backlight when the right eye image light source is activated and the left eye image light source is deactivated.

FIGS. 2A-D illustrate the general operation of an autostereoscopic display. Note that FIGS. 2A and 2C are not to scale and the data presented in FIGS. 2B and 2D are not actual data. Some features of the structures in FIGS. 2A and 2C and some aspects of the data in FIGS. 2B and 2D have been exaggerated to more effectively explain the general operation of an autostereoscopic display.

FIG. 2A and FIG. 2C are schematic side views of a portion of a display apparatus in operation. In FIG. 2A, the left eye image light source 234 is activated and the right eye image light source 232 is not activated. In this state, the light emitted from the left eye image light source 234 transmits through the backlight 230 (including the light guide 250 and the double sided optical film 240) and the liquid crystal panel (120 shown in FIG. 1A) providing a left eye image directed toward the left eye 264 of a viewer. In FIG. 2C, the right eye image light source 232 is activated and the left eye image light source 234 is not activated. In this state, the light emitted from the right eye light source 232 transmits through the backlight 230 (including the light guide 250 and the double sided optical film 240) and liquid crystal panel (120 shown in FIG. 1A) providing a right eye image directed toward the right eye 262 of the viewer. It is understood that while the right eye image light source 232 is located on the right side of the light guide 250 and the left eye image light source 234 is located on the left side of the light guide 250, in some embodiments, the right eye image light source 232 may be located on the left side of the light guide 250 and the left eye image light source 234 may be located on the right side of the light guide 250.

The light sources 232, 234 can be air coupled or index matched to the light guide 250. For example, a packaged light source device (e.g., LED) can be edge-coupled without index matching material within the light guide 250. Alternatively, packaged or bare die LEDs can be index matched and/or encapsulated in the sides 231, 233 of the light guide 250 for increased efficiency. This feature may include additional optical features, e.g., injection wedge shapes, on the sides 231, 233 of the light guide 250 to efficiently transport the input light. The LEDs can be alternatively embedded in the sides 231, 233 of the light guide 250 with appropriate features to efficiently collect and collimate the LED light into total internal reflection (TIR) modes of the light guide 250.

Liquid crystal display panels 120 (see FIG. 1A) have a refresh or image update rate that is variable, but for the purposes of this example, a 120 Hz refresh rate is presumed. This means that a new image is presented to the viewer every $\frac{1}{120}$ second or 8.333 milliseconds (msec). In the 3D system this means that at time t=0 (zero) the right image of frame one is presented. At time t=8.333 msec the left image of frame one is presented. At time t=2*8.333 msec the right image of frame two is presented. At time t=3*8.333 msec the left image of frame two is presented, and this process is thus repeated. The effective frame rate is half that of a normal imaging system because for each image a left eye and right eye view of that image is presented.

In this example, turning the first plurality of light sources ON to light the right (or left) image at time t=0 provides light to the right (or left) image, respectively. At time t=8.333 msec the second image left or right, starts to be put in place. This image replaces the "time t=0 image" from the top of the LCD panel to the bottom of the LCD, which takes 8.333 msec to complete in this example.

Providing at least 45 left eye images and at least 45 right eye images (alternating between right eye and left eye images and the images are possibly a repeat of the previous image pair) to a viewer per second provides a substantially flicker-free 3D image to the viewer. Accordingly, displaying different right and left viewpoint image pairs from computer rendered images or images acquired from still image cameras or video image cameras, when displayed in synchronization with the switching of the light sources 232 and 234, enables the viewer to visually fuse the two different images, creating the perception of depth from the flat panel display. A limitation of this visually flicker-free operation is that the backlight should not be on until the new image that is being displayed on the liquid crystal display panel has stabilized; otherwise, cross-talk and a poor stereoscopic image will be perceived.

The backlight 230 (including the light guide 250, light sources 232, 234, and optical film 240) described herein can be very thin such as, for example, less then 5 millimeters, or from 0.25 to 5 millimeters, or from 0.5 to 4 millimeters, or from 0.5 to 2 millimeters.

FIG. 2A illustrates the operation of the backlight 230 during a first time frame a in which the left eye image light source 234 is ON and the right eye image light source 232 is OFF. Light rays 280 from light source 234 enter the light guide 250 through surface 233. Initially, light ray 280 strikes the surface 252 of light guide 250 at angle $\gamma_1$ which is larger than the critical angle necessary for total internal reflection (TIR). Thus, light ray 280 is totally internally reflected, and continues propagating down the light guide 250. Eventually light ray 280 is redirected by an extraction feature 299 disposed on surface 251 of the light guide 250. Redirection of light ray 280 by the extraction feature 299 changes the angle of incidence of light ray 280 on light guide surface 252 to an angle less than the critical angle for TIR, allowing light ray 280 to be emitted from the surface 252 of light guide 250.

Light ray 280 next encounters the prism features 241 of optical film 240. The prisms of optical film 240 operate as a turning film, changing the angle of light ray 280 in the direction of the axis 243 perpendicular to the plane of the optical film 240. Light ray 280 experiences further refraction when it encounters the lens 242. Light ray 280 eventually emerges at an exit angle $\theta_1$ from the optical film 240.

FIG. 2B is a graph illustrating an example of an angular output distribution for light rays emerging from optical film 240 in the xz plane during the first time period. For example, at an exit angle of θ=0, light rays emerge from optical film 240 along axis 243. Light rays emerging from optical film 240 at the negative angles shown on the horizontal axis in FIG. 2B are directed toward the left in FIG. 2A. Light rays emerging from the optical film 240 at the positive angles shown on the horizontal axis of FIG. 2B are directed toward the right in FIG. 2A. In this example, the angular output distribution from the back light 230 when the left eye image light source 234 is active and the right eye image light source 232 is inactive peaks at about −8 degrees.

With reference to FIG. 2C, during a second time period, the left eye image light source 234 is turned OFF and the right eye image light source 232 is turned ON. Light rays 290 from light source 232 enter the light guide 250 through surface 231. Light ray 290 is propagated down the light guide 250 by TIR until it is refracted by an extraction feature 299 disposed on the surface 251 of the light guide 250. Refraction of light ray 290 by the extraction feature 299 allows light ray 290 to be emitted from the surface 252 of light guide 250. Light ray 290 next encounters optical film 240 and experiences further refraction. Light ray 290 eventually emerges at an exit angle $\theta_2$ from the optical film 240.

FIG. 2D is a graph illustrating an example of an angular output distribution for light rays emerging from optical film 240 in the xz plane during the second time period. Light rays emerging from the optical film 240 at the negative angles shown on the horizontal axis in FIG. 2D are directed toward the left in FIG. 2C. Light rays emerging from the optical film 240 at the positive angles shown on the horizontal axis of FIG. 2D are directed toward the right in FIG. 2C. In this example, the angular output distribution from the back light 230 when the right eye image light source 232 is active and the left eye image light source 234 is inactive peaks at about 8 degrees.

Double sided optical films described herein having lenses on one surface registered to corresponding prisms on the opposing surface. As previously discussed, each lens and its corresponding prism on an optical film are referred to herein as a lens/prism pair. The lenses of the optical films may be cylindrical or a-cylindrical. The prisms may be contiguous or non-contiguous. In some embodiments, the configuration of the lens/prism pairs varies as a function of position across the surface of the optical film. For example, either the lens can be rotated as a function of position and/or an offset between the lenses and the prisms of the lens/prism pairs may vary as a function of position. Variation in offset between the lenses and their corresponding prisms may be achieved by using a prism pitch that is different from, e.g., greater than, the pitch of the lenses. The use of a-cylindrical lenses and/or the variation of the lens/prism configuration as a function of position directs the light output from the optical film toward the viewer, which sharpens the "stereo edge" (discussed below) of the light output distributions and reduces crosstalk, thereby enhancing the performance of autostereoscopic displays that incorporate these optical films.

Autostereoscopic displays produce depth perception in the viewer even though the image is produced by a flat device. At a basic level, an autostereoscopic display must present each eye with its respective parallactic view. For best operation, it is desirable that the light intended for the left eye is only received by the left eye. Any light that is intended for the right eye that is received by the left eye will degrade the 3D viewing experience. Light intended for the right eye that is received by the left eye or light intended for the left eye that is intended for the right eye is a type of cross-talk. Thus the light distributions that leave the display and are received by the eye must be well separated. However, for a quality viewing experience, the two light distributions should be as close together as possible to reduce viewing artifacts and also allow for a good 2D viewing experience.

The viewer's location with respect to the display limits the minimum level of cross-talk that can be achieved. Because the viewer's eyes are a fixed distance apart (nominally 63.5 mm), the angle subtended by the eyes gets smaller as the viewing distance increases and, as a result, the separation between the left and right light distributions has to become sharper. In other words, increasing the viewing distance leads to increased cross-talk. The angular width of the edge of either the left or right light distribution can be referred to as the "stereo edge". Practically, the width of the stereo edge may be measured as the width in degrees between 10% of peak value of the light distribution and 90% of peak value of the light distribution. As viewing distance increases, it is desirable for the width of the stereo edge to decrease. A sharper stereo edge allows for a greater viewing distance.

Another effect associated with the stereo edge is viewing freedom. For a comfortable 3D experience, it is desirable that the viewer be able to move their head side-to-side for some distance. The more one can move their head and still perceive 3D, the more viewing freedom there is. If the stereo edge is fairly broad, then moving the head side-to-side will increase cross-talk and hence degrade the 3D effect. Thus, a sharper stereo edge leads to more viewing freedom.

The size of the display is also a factor in determining the quality of the 3D viewing experience. The light distribution from the edge of a display has to aim at a steeper angle than the light near the center of the display in order to be received by the viewer's eyes. The wider the display, the steeper this aiming angle becomes. Thus it is important that the autostereoscopic display aim the light to the viewer as a function of the display width without compromising the stereo edge.

Double sided optical films having a-cylindrical lenses and/or variable lens/prism pair configurations as described herein reduce cross-talk, reduce the width of the stereo edge, and improve aiming of the light distributions. These optical films provide for an enhanced 3D viewing experience, including more viewing freedom, larger display sizes, and/or longer viewing distances.

Figure 3:
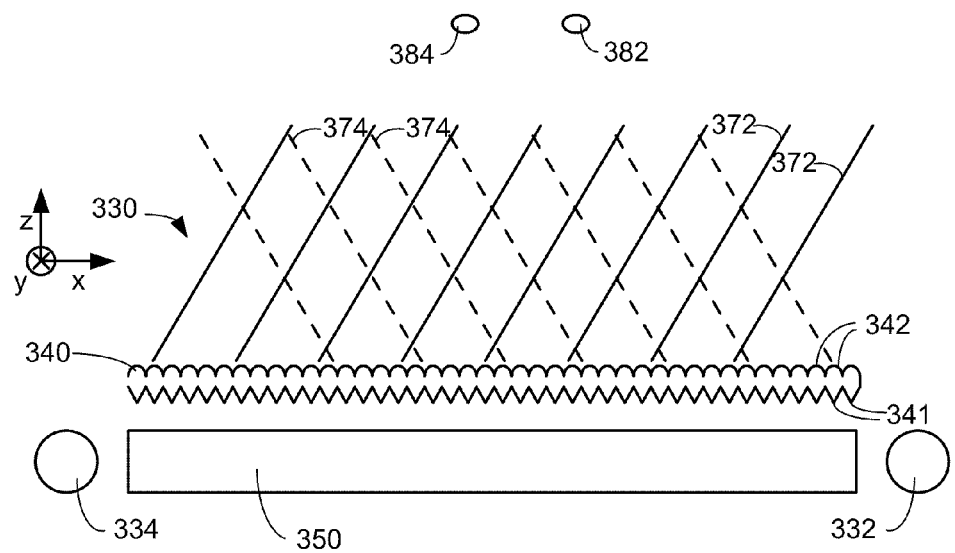
FIGS. 3 and 4 compare the effects of two types of optical films on the direction of light emerging from the light guide.
Figure 4:
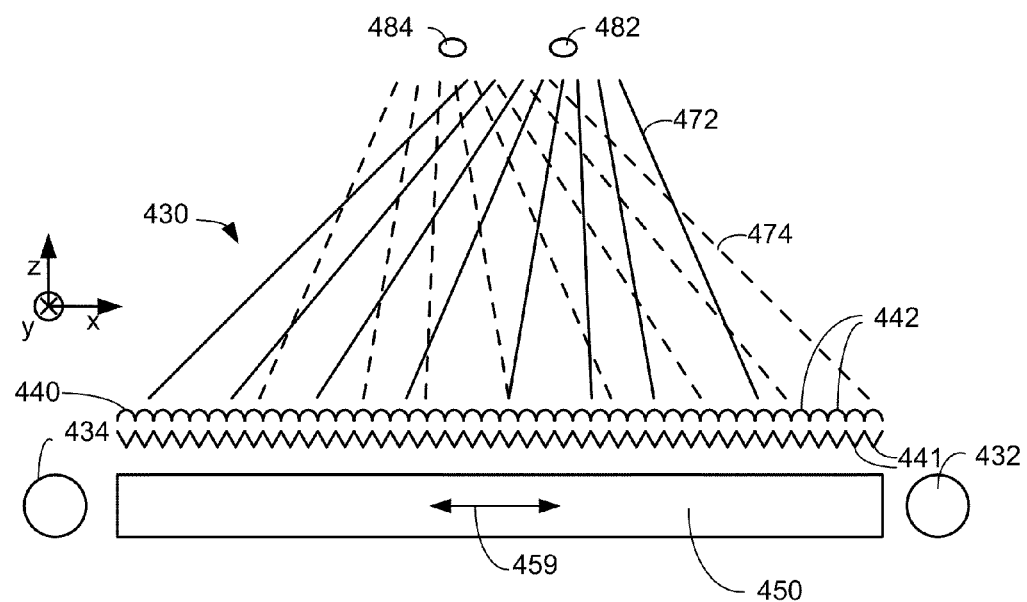

FIGS. 3 and 4 compare the light output of back light 330 including an optical film 340 with the light output of back light 430 including optical film 440. Optical film 340 has uniformly spaced cylindrical lenses 342 disposed on one surface of the optical film 340 and corresponding uniformly spaced prisms 341 disposed on the opposing surface of the optical film 340. The configuration of the lenses 342 and their corresponding prisms 341 (lens/prism pairs) is substantially uniform along the x axis. In the xz plane, the cross sections of the lenses 342 are uniform and the cross sections of the prisms 341 are uniform. The lenses 342 are not rotated and the pitch of the lenses 342 is constant and is equal to the pitch of the prisms 341. Back light 330 includes a light guide 350 and right and left eye image light sources 332, 334 that operate similarly to comparable components described in connection with FIGS. 2A-2D.

Optical film 440 comprises lens/prism pairs having a configuration that varies along the x axis. For example, the lens rotation may vary as a function of x, and/or the prism pitch may be different from the lens pitch. A prism pitch that is different from the lens pitch, e.g., a prism pitch greater than the lens pitch leads to a variation in the offset between the lenses and their corresponding prisms that varies along the x axis. Back light 430 includes a light guide 450 and right and left eye image light sources 432, 434 that operate similarly to comparable components described in connection with FIGS. 2A-2D.

The light output angular distributions (represented by the peak light output angle) for various points on the optical film 340 when the left eye image light source 334 is ON and the right eye image light source 332 is OFF are indicated by the dashed lines 374 in FIG. 3. For example, in the case of a back light having the angular output distribution shown in FIG. 2B, the peak light output angle is about −8 degrees with respect to the z axis. The light output angular distributions for various points on the optical film 340 when the right eye image light source 332 is ON and the left eye image light source 334 is OFF are indicated by the solid lines 372 in FIG. 3. For example, in the case of a back light having the angular output distribution shown in FIG. 2D, the peak light output angle is about 8 degrees with respect to the z axis. The light output from the back light 330 changes direction toward the right or left eyes 382, 384 depending on whether the right eye image light source 332 is activated or the left eye image light source 342 is activated. The cylindrical lens/prism pairs having a uniform configuration across the optical film 340 change the direction of the light when the light sources are alternated, i.e., the direction of the light changes from negative to positive angles with respect to the z axis when the light sources are alternated, but the optical film does not substantially aim the light toward the right or left eyes 382, 384 as a function of position on the optical film 340.

FIG. 4 depicts a back light 430 that includes an optical film 440 that changes the direction of the light and aims the light toward the left or right eyes as a function of position during the time multiplexed periods. The optical film 440 includes lens/prism pairs having a configuration that varies along the x axis. The optical film 440 includes lenses 442 on the surface of the optical film 440 oriented away from the light guide 450. Each lens 442 has a corresponding prism 441 on the opposing surface of the optical film 440. The optical film 440 is arranged so that the longitudinal axis of the lenses 442 and prisms 441 is oriented substantially perpendicular to the axis of light propagation 459 in the light guide 450. In the example depicted in FIG. 4, the longitudinal axis of the lenses 442 and prisms 441 (also shown as element 155 in FIG. 1B) is along the y axis. The optical film need not be arranged so that the longitudinal axis of the lenses is perpendicular to the direction of light propagation.

In some implementations, a bias angle between the longitudinal axis of the lenses and prisms and the light propagation direction can be used to reduce Moiré between the optical film, the light guide, and the LCD panel. The bias angle may be less than 15 degrees or less than 10 degrees or less than 5 degrees, for example.

The configuration of the lens/prism pairs of optical film 440 varies with position along the x axis. The variation in the configuration of the lens/prism pairs modifies the angular light output distribution of optical film 440 as a function of position along the x axis. For simplicity, the light output angular distributions for positions along the x axis when the left eye image light source 434 is activated are represented by the dashed lines 474 which indicate the direction of the light output at peak output.

The light output angular distributions for positions along the x direction when the right eye image light source 432 is activated are represented by the solid lines 472 which indicate the direction of the light output at peak output. The angle of the peak light output 472 varies as a function of x to aim the light toward the right eye position 482.

The light output from the back light 430 is directed toward the right eye position 482 when the right eye image light source 432 is activated. The angle of the peak light output 472 varies as a function of x to aim the light toward the right eye position 482. The light output from the back light 430 is directed toward the left eye position 484 when the left eye image light source 434 is activated. The angle of the peak light output 474 varies as a function of x to aim the light toward the left eye position 484.

Thus, the variation of the lens/prism pair configuration as a function of position aims the light output from the film toward the viewer's left eye when the left eye image light source is on and aims the light output from the optical film toward the viewer's right eye when the right eye image light source is on. Aiming the light toward the left or right eye reduces crosstalk between the left and right images which enhances the 3D viewing experience. That is, aiming the light toward the left or right eyes reduces the amount of light intended for the left eye that is received by the right eye and reduces the amount of light intended for the right eye that is received by the left eye.

Figure 9A:
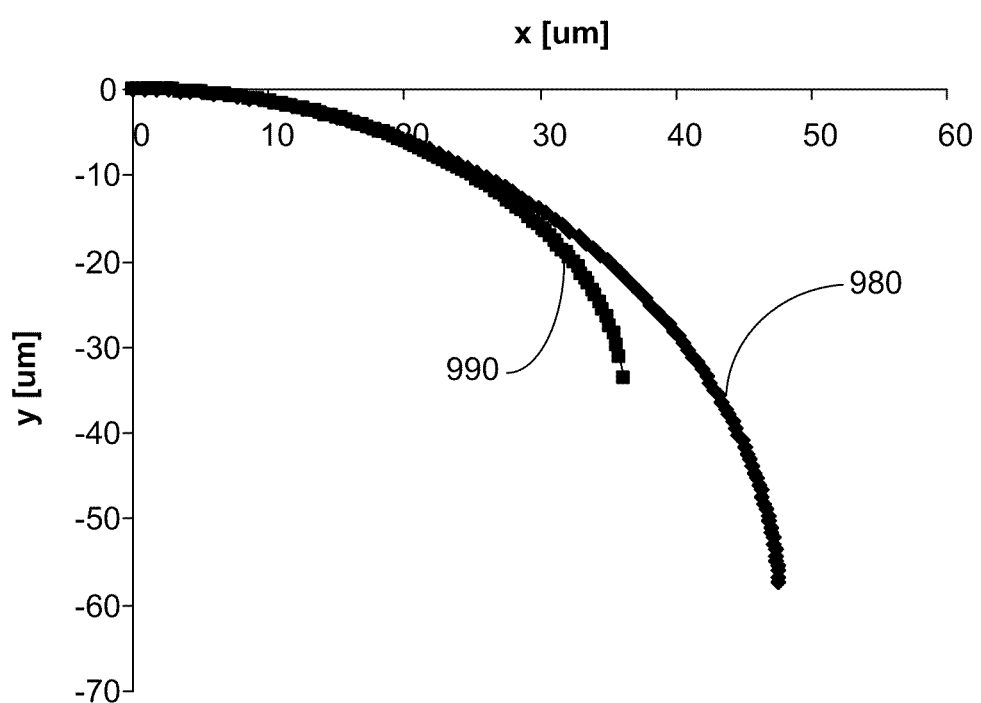
FIG. 9A illustrates the profiles of a cylindrical lens and an a-cylindrical lens.

Some optical film embodiments use lens/prism pairs that include a-cylindrical lenses on one surface of the optical film that are registered with prisms on the opposing surface of the optical film. In general, a-cylindrical lenses may have any shape that is not cylindrical. An exemplary a-cylindrical lens shape useful for autostereoscopic films is illustrated in FIG. 9A. A-cylindrical lenses have a stigmatic focus which serves to reduce the stereo edge of the optical film so that the left and right light distributions have a small amount of overlap and the slope of the overlap is relatively steep. A-cylindrical lenses may be used in lens/prism pairs that have substantially uniform configuration across the optical film or they may be used in lens/prism pairs having configurations that vary as a function of position on the optical film.

FIGS. 5A-5D and 6B-6E are cross sectional diagrams of exemplary optical films that may be used in autostereoscopic display systems. It is understood that an actual optical film would have many more lens/prism pairs than depicted in these Figures. For convenience, only a few of the lens/prism pairs are shown in the cross sectional diagrams. FIGS. 5A-5D illustrate optical films that incorporate a-cylindrical lenses. A-cylindrical lenses may have any non-cylindrical cross sectional shape. An example of a useful a-cylindrical lens shape for optical films used in autostereoscopic displays is illustrated in FIG. 9A. FIGS. 6B-6E illustrate variations of optical films that use a-cylindrical lenses or cylindrical lenses. Cylindrical lenses have a cross section that is a portion of a circle.

Figure 5A:
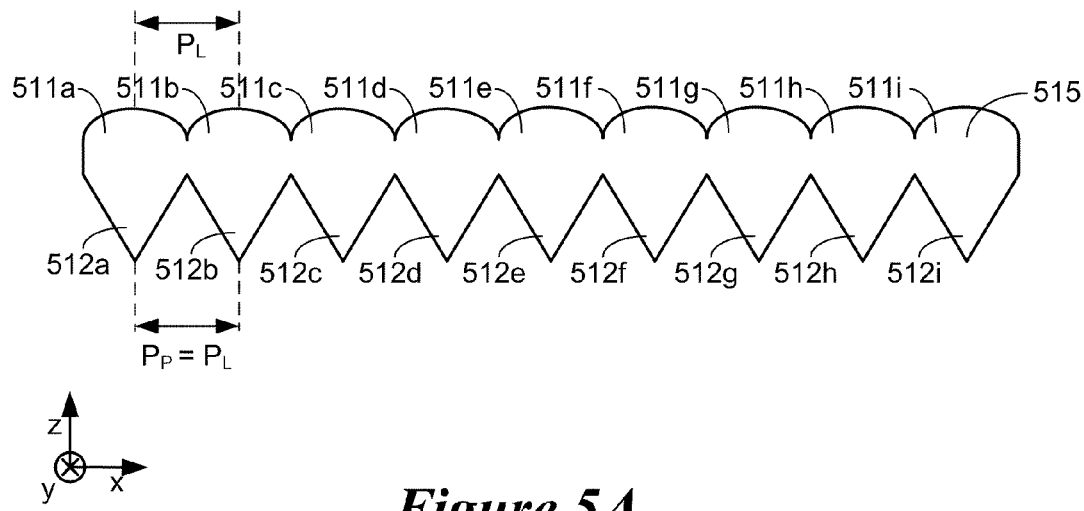
FIG. 5A is a cross section of an optical film that includes a-cylindrical lenses on one surface of the optical film registered to contiguous prisms on the opposing surface of the optical film and the lens pitch is substantially equal to the prism pitch.

FIG. 5A illustrates an optical film 515 in accordance with embodiments of the invention having lens/prism pairs 511a/512a, 511b/512b, 511c/512c, 511d/512d, 511e/512e, 511f/512f, 511g/512g, 511h/512h, 511i/512i. The lenses 511a-511i are a-cylindrical and may have a cross section as illustrated, for example, in FIG. 9A, or may have another a-cylindrical cross section. Each a-cylindrical lens 511a-511i on a surface of the optical film 515 is registered to a corresponding prism 512a-512i on an opposing surface of the optical film 515. The pitch of the a-cylindrical lenses, $P_L$, is constant and substantially equal to the pitch of the prisms, $P_P$. Both the a-cylindrical lenses 511a-511i and the prisms 512a-512i are contiguous. The cross section of the lens/prism pairs 511a/512a, 511b/512b, 511c/512c, 511d/512d, 511e/512e, 511f/512f, 511g/512g, 511h/512h, 511i/512i is substantially uniform, i.e., does not substantially vary from pair to pair along the x axis.

Figure 5B:
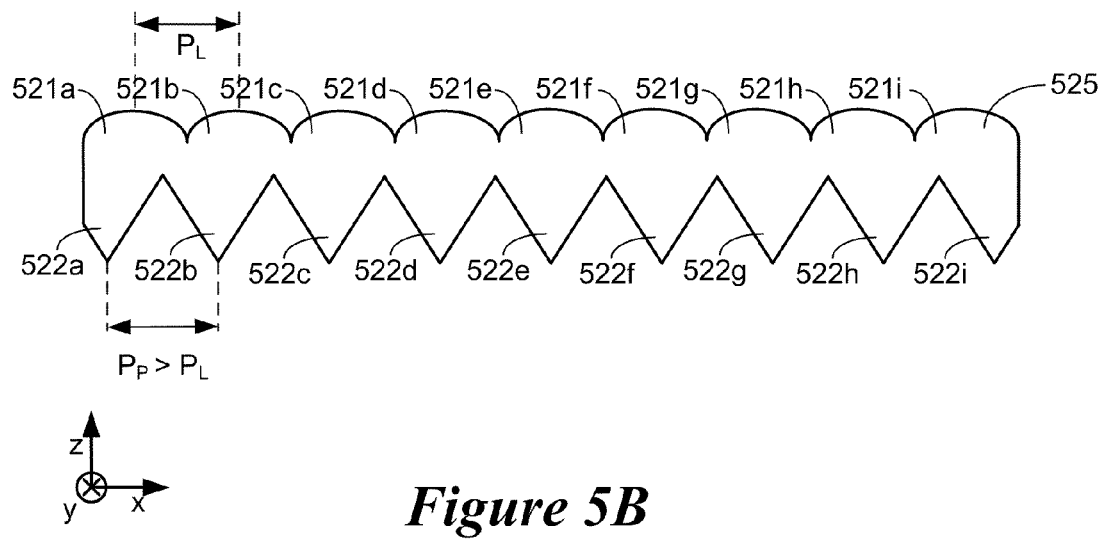
FIG. 5B is a cross section of an optical film that includes a-cylindrical lenses on one surface of the optical film registered to contiguous prisms on the opposing surface of the optical film and the prism pitch is greater than the lens pitch.

FIG. 5B illustrates an optical film 525 that includes a-cylindrical lenses 521a-521i on one surface of the optical film 525 registered with prisms 522a-522i on an opposing surface. The cross section of the a-cylindrical lenses 521a-521i is uniform along the x axis. The cross section of the prisms 522a-522i is uniform along the x axis. Both the a-cylindrical lenses 521a-521i and the prisms 522a-522i are contiguous. The pitch of the prisms, $P_P$, is greater than the pitch of the a-cylindrical lenses, $P_L$. The difference in the prism pitch and the lens pitch causes the prisms 522a-522i to be offset from their corresponding a-cylindrical lenses 521a-521i. For example, in FIG. 5B, the vertex of a-cylindrical lens 521e is aligned with the vertex of the corresponding prism 522e. Due to the difference between $P_L$ and $P_P$, the lens/prism pairs 521d/522d, 521f/522f that immediately neighbor lens/prism pair 521e/522e have lenses and prisms that are offset by ½ the difference between $P_P$ and $P_L$. The offset between the lenses and prisms in the lens/prism pairs 521c/522c, 521g/522g, 521b/522b, 521h/522h, 521a/522a, 521i/522i increases in both directions along the x axis as a function of distance from the starting point, in this example, the aligned lens/prism pair 521e/522e.

Although FIG. 5B (and other Figures herein) only show one aligned lens/prism pair, it is to be understood that optical films may be constructed that include any number of aligned lens/prism pairs, or no aligned lens/prism pairs. In the case of multiple aligned lens/prism pairs, the films may have a prism pitch that is different from the lens pitch which causes an offset between the lenses and prisms that increases with distance from each aligned lens/prism pair.

In some display implementations, the aligned lens/prism pair may be arranged at about the center of the display so that the increasing offset between the lenses and the prisms that occurs on either side of the aligned lens/prism pair serves to aim the light output from the optical film toward the center of the display.

Some autostereoscopic double sided films described herein include contiguous features on both sides of the optical film. However, contiguous features on both sides of the film can have some disadvantages. The thickness of the thin land, either between the lenses and the substrate, and/or between the prisms and the substrate, is determined by the optics of the film, but the sharp corners and the thinness of the land can cause delamination. In addition, differences in the volume and structure of the features on the double sided film can exacerbate film warping. From an optical perspective, the double sided film with contiguous features also has a broader horizontal viewing range than may be desirable. Because the autostereoscopic optical effects depend in part on the peaks of the prisms, some optical films described herein include interruptions between the bases of the prisms making the prisms non-contiguous. The shape of the prisms near the interruptions can be tailored to reduce the sharpness of the transition at the interruptions between the prisms and the substrate. For example, a curved rather than a sharp transition may be used to improve the mechanical stability of the film, to prevent cracking and delamination, and/or to reduce film warping.

Figure 5C:
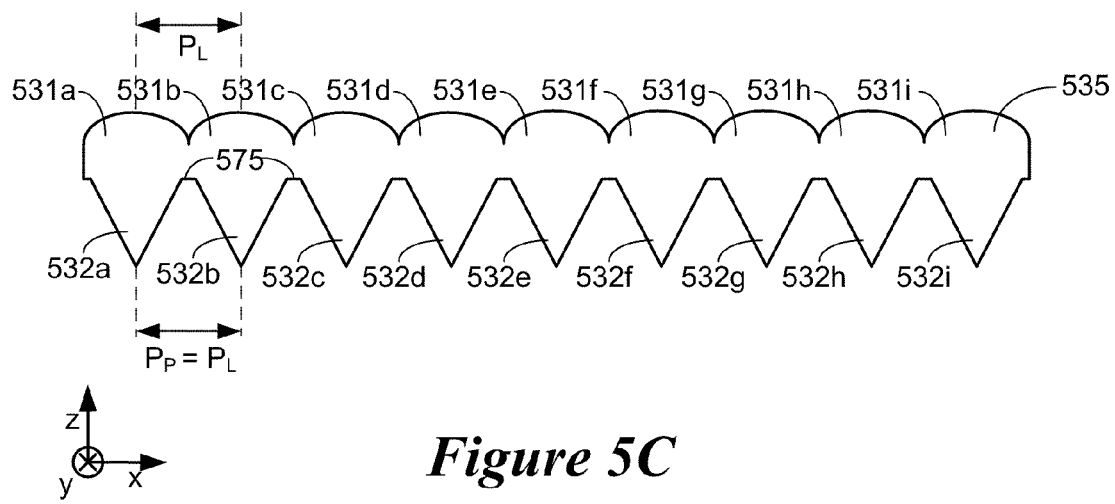
FIG. 5C is a cross section of an optical film that includes a-cylindrical lenses on one surface of the optical film registered to non-contiguous prisms on the opposing surface of the optical film and the lens pitch is substantially equal to the prism pitch.
Figure 5D:
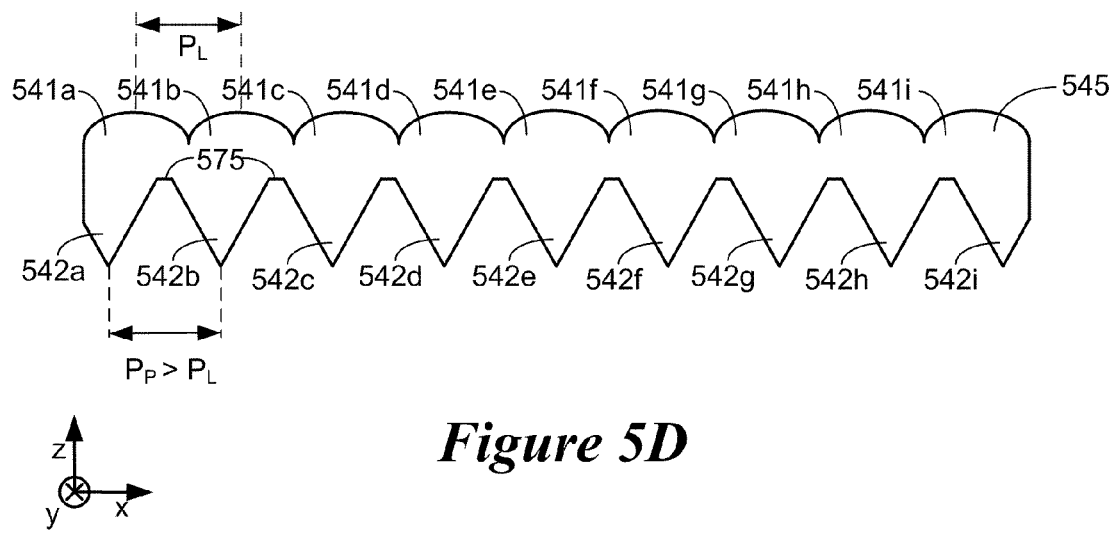
FIG. 5D is a cross section of an optical film that includes a-cylindrical lenses on one surface of the optical film registered to non-contiguous prisms on the opposing surface of the optical film and the prism pitch is greater than the lens pitch.

Optical films 535 and 545, shown in FIGS. 5C and 5D, respectively, include a-cylindrical lenses and non-contiguous prisms. FIG. 5C is a cross section of an optical film 535 having a-cylindrical lenses 531a-531i on one side of the optical film 535 registered to non-contiguous prisms 532a-532i on the opposing side of the optical film 535. The cross sections of the a-cylindrical lenses 531a-531i and the cross sections of the prisms 532a-532i are substantially uniform along the x axis. The pitch of the prisms is substantially equal to the pitch of the a-cylindrical lenses.

An interruption 575 occurs between each prism 532a-532h and its neighboring prism 532b-532i. The interruptions 575 make the prisms 532a-532i non-contiguous. Although the shape of the optical film at the interruptions 575 in FIG. 5C and elsewhere is depicted as flat, the shape of the optical film at the interruptions 575 may take on any shape, e.g., a curved shape.

Optical film 545 shown in FIG. 5D includes a-cylindrical lenses 541a-541i on one side of the optical film 545 registered to non-contiguous prisms 542a-542i on the opposing side of the optical film 545. Interruptions 545 occur between prisms 542a-542i making the prisms non-contiguous. In this example, the cross section of the a-cylindrical lenses 541a-541i is substantially uniform along the x axis and the cross section of the prisms 542a-542i is substantially uniform along the x axis. The pitch of the prisms, $P_P$, is greater than the pitch of the lenses, $P_L$, causing an offset between the a-cylindrical lenses 541a-541i and their corresponding prisms 542a-542i as a function of position on the optical film 545. The offset increases as a function of distance from an aligned lens/prism pair.

Figure 6A:
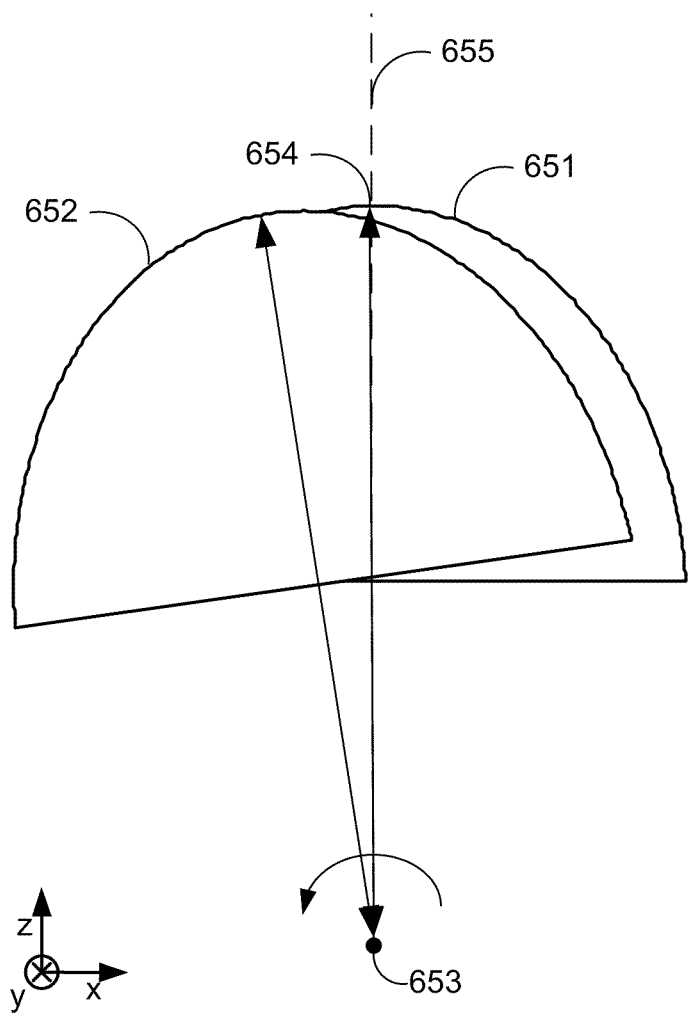
FIG. 6A illustrates the rotation of a lens.

Some optical film implementations include cylindrical or a-cylindrical lenses having a rotation that varies with position on the optical film. The rotation of the cylindrical or a-cylindrical lenses serves to aim the light appropriately toward the left or right eyes as discussed in connection with FIG. 4. FIG. 6A illustrates the position of a lens before rotation 651 and after rotation 652. The rotation is in a plane that is substantially perpendicular to a longitudinal vertex of the lenses (the xz plane in FIG. 6A) and is about a rotation point 653 below the lens vertex 654 and on the lens centerline 655. For example, the rotation point 633 may be the focal point of the lens, or about 114 microns below the vertex 654 of the lens, or may coincide with the vertex of the prism (not shown in FIG. 6A) of the lens/prism pair.

Figure 6B:
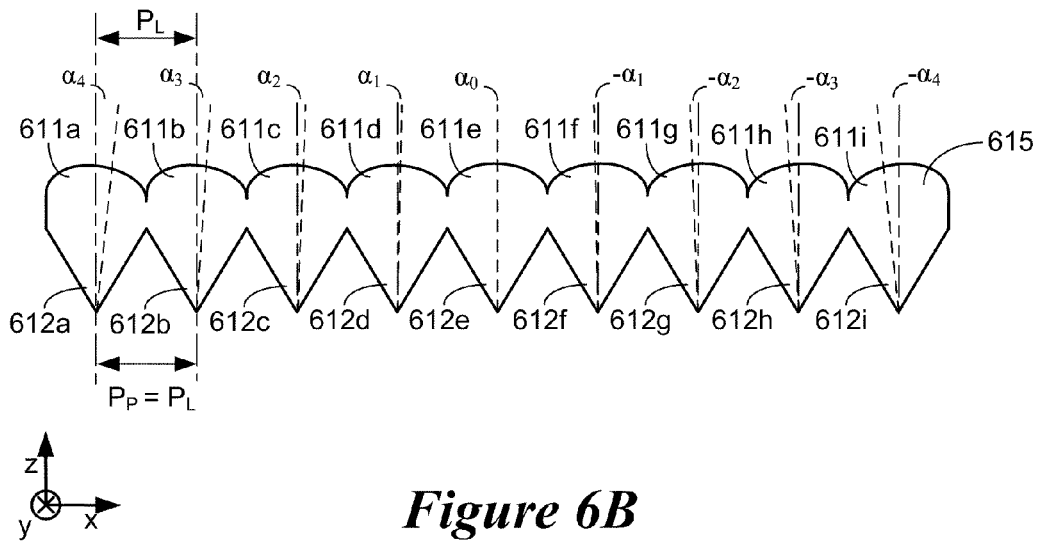
FIG. 6B is a cross section of an optical film that includes rotated cylindrical or a-cylindrical lenses on one surface of the optical film registered to contiguous prisms on the opposing surface of the optical film and the lens pitch is substantially equal to the prism pitch.

FIG. 6B is a cross section of a double sided optical film 615 including lenses 611a-611i that are rotated as a function of x axis position. The lenses 611a-611i may be a-cylindrical or cylindrical lenses. Each of the lenses 611a-611i is registered to a prism 612a-612i on the opposing surface of the optical film 615. In this example, the prism pitch, $P_P$, is constant and equal to the lens pitch, $P_L$. The lenses 611a-611i are rotated as a function of x axis position. For example, the degree of rotation of the lenses 611a-611i may increase on either side of a starting point on the optical film 615. In FIG. 6B, lens 611e is the starting point for the lens rotation. The starting point does not need to be a lens and may occur between lenses. Although lens 611e has zero rotation, this also need not be the case. If a lens is used as the starting point, the starting point lens can have any rotation including zero rotation. Multiple rotation starting points may occur on an optical film.

In some display applications, the starting point for the lens rotation may be near the center of the display, or can be offset to adjust the viewing angle. Lenses on one side of a starting point may be rotated at negative angles with respect to their center lines and lenses on the other side of the starting point may be rotated at positive angles with respect to their center lines. When installed in a display, the optical film may have one starting point that is aligned with the intended viewer position. Lenses on one side of the starting point may be rotated at negative angles with respect to their center lines and lenses on the other side of the starting point may be rotated at positive angles with respect to their center lines. The angle of rotation of the lenses may increase with distance from the starting point to aim the light at sharper angles nearer to the display edge.

Optical film 615 illustrates angles of rotation, α, that increase with distance from the starting point, lens 611e, which in this example has a rotation of 0 degrees. As previously discussed, in some optical films, lenses on either side of the starting point may be rotated in opposite directions. For example, in FIG. 6B, lenses to the right of starting point lens 611e are rotated at negative angles with respect to their center lines. Lenses to the left of starting point lens 611e are rotated at positive angles with respect to their centerlines. Lenses 611d and 611f, which are disposed on either side of lens 611e, are rotated at angles $+\alpha_1$ or $-\alpha_1$, respectively. As explained in connection with FIG. 6A, the lenses are rotated in the xz plane with respect to a rotation point below the lens vertex and on the lens centerline. Lenses 611d and 611f have neighboring lenses 611c and 611g, respectively, which are rotated at angles $+\alpha_2$ or $-\alpha_2$, where $|\alpha_1|<|\alpha_2|$. Lenses 611c and 611g have neighboring lenses 611b and 611h, respectively, which are rotated at angles $+\alpha_3$ or $-\alpha_3$, where $|\alpha_2|<|\alpha_3|$. Lenses 611b and 611h have neighboring 611a and 611i, respectively, which are rotated at angles $+\alpha_4$ or $-\alpha_4$, where $|\alpha_3|<|\alpha_4|$.

Depending on the application, the lenses may be rotated linearly or non-linearly with position on the optical film. The rotation on either side of a starting point need not be symmetrical.

Figure 6C:
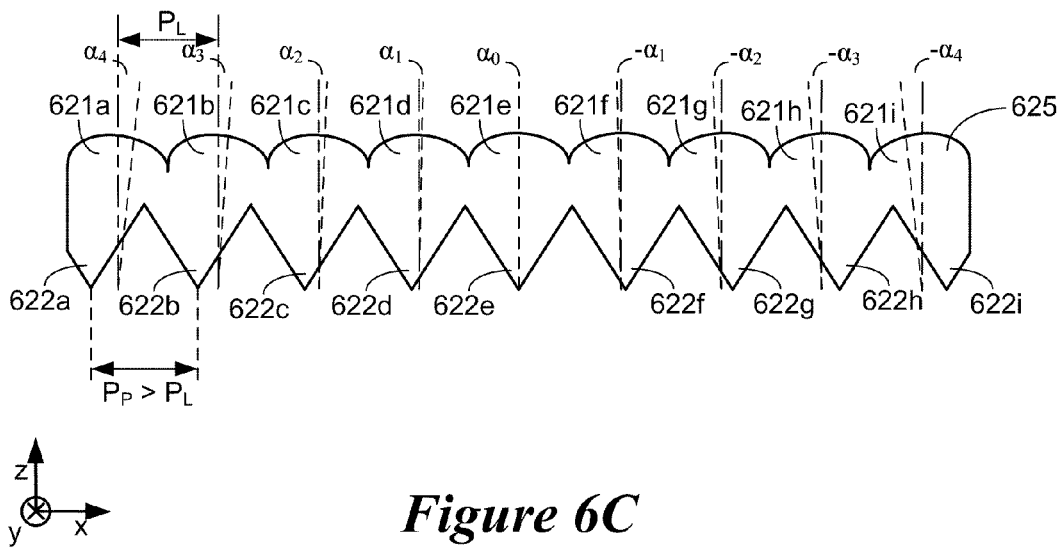
FIG. 6C is a cross section of an optical film that includes rotated cylindrical or a-cylindrical lenses on one surface of the optical film registered to contiguous prisms on the opposing surface of the optical film and the prism pitch is greater than the lens pitch.

FIG. 6C illustrates an optical film 625 having lenses 621a-621i that are rotated as previously described in connection with FIG. 6B. The lenses may be a-cylindrical or cylindrical lenses. Lenses to the right of starting point lens 621e are rotated at negative angles with respect to their center lines. Lenses to the left of starting point lens 621e are rotated at positive angles with respect to their center lines. Lenses 621d and 621f, which are disposed on either side of lens 621e, are rotated at angles $+\alpha_1$ or $-\alpha_1$, respectively. Lenses 621d and 621f have neighboring lenses 621c and 621g, respectively, which are rotated at angles $+\alpha_2$ or $-\alpha_2$, where $|\alpha_1|<|\alpha_2|$. Lenses 621c and 621g have neighboring lenses 621b and 621h, respectively, which are rotated at angles $+\alpha_3$ or $-\alpha_3$, where $|\alpha_2|<|\alpha_3|$. Lenses 621b and 621h have neighboring lenses 611a and 611i, respectively, which are rotated at angles $+\alpha_4$ or $-\alpha_4$, where $|\alpha_3|<|\alpha_4|$.

In addition to the rotation of the lenses 621a-621i, the optical film 625 of FIG. 6C also has a prism pitch, $P_P$, that is different from the lens pitch, $P_L$. As shown in FIG. 6C, the prism pitch can be greater than the lens pitch. Alternatively, the lens pitch may be greater than the prism pitch. When the prism pitch is different from the lens pitch, a variable offset between the lenses 621a-621i and the prisms 622a-622i in the lens/prism pairs increases with distance from the aligned lens/prism pair. In the example of FIG. 6C, the aligned lens/prism pair is lens/prism pair 621e/622e which is also the starting point for the rotation. When both prism rotation and unequal prism and lens pitches are used together, the aligned lens/prism pair (the starting point for the increasing offset between lenses and prisms) and the starting point for the lens rotation may be the same point on the optical film or may be different points on the optical film. Using both rotated lenses and a prism pitch larger than the lens pitch further aims the light appropriately toward the desired position, reducing crosstalk and stereo edge for improved 3D viewing results.

Figure 6D:
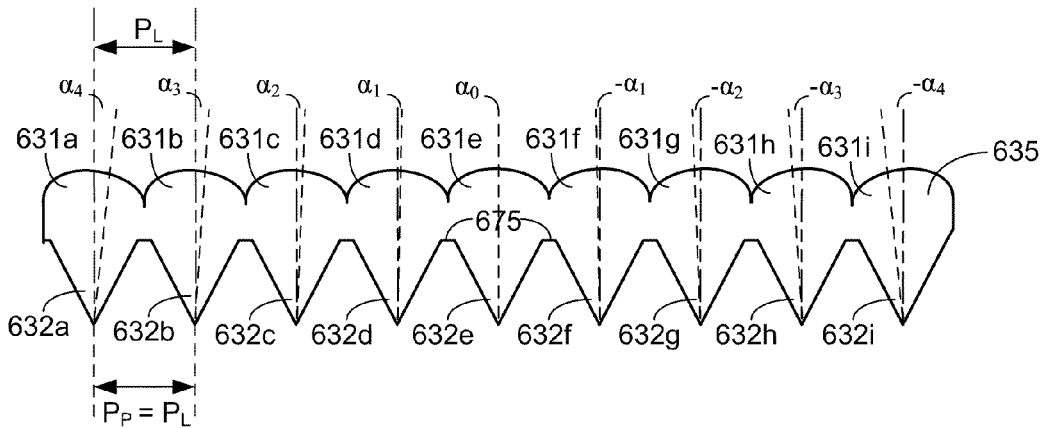
FIG. 6D is a cross section of an optical film that includes rotated cylindrical or a-cylindrical lenses on one surface of the optical film registered to non-contiguous prisms on the opposing surface of the optical film and the lens pitch is substantially equal to the prism pitch.

FIG. 6D illustrates an optical film 635 having lenses 631a-631i that are rotated as previously described in connection with FIGS. 6B and 6C. The lenses 631a-631i may be a-cylindrical or cylindrical. The prisms 632a-632i are non-contiguous, having interruptions 675 between each prism 632a-632i. The pitch of the prisms is substantially equal to the pitch of the lenses.

Figure 6E:
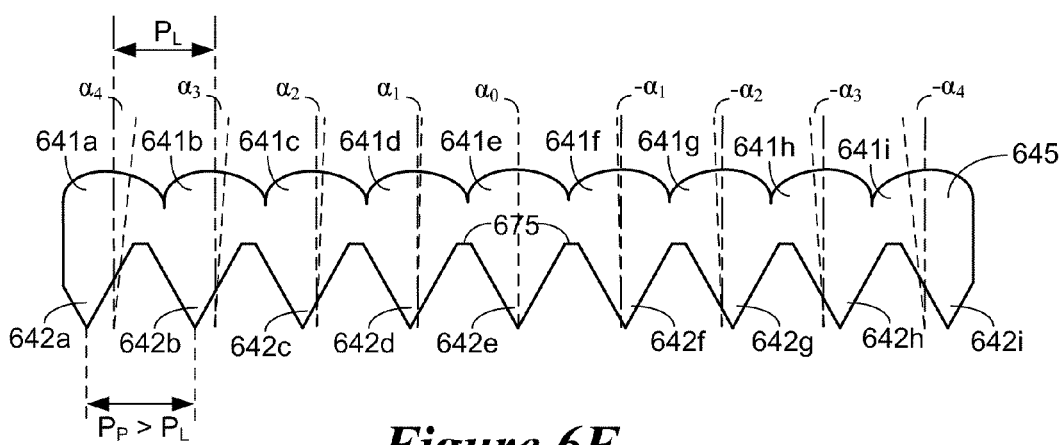
FIG. 6E is a cross section of an optical film that includes rotated cylindrical or a-cylindrical lenses on one surface of the optical film registered to non-contiguous prisms on the opposing surface of the optical film and the prism pitch is greater than the lens pitch.

Optical film 645 depicted in FIG. 6E includes lenses 641a-641i that are rotated as previously described in connection with FIGS. 6B and 6C. The lenses 631a-631i may be a-cylindrical or cylindrical lenses. The prisms 642a-642i are non-contiguous, having interruptions 675 between each prism 642a-642i. In this version, the pitch of the prisms is greater than the pitch of the lenses. Alternatively, the lens pitch may be greater than the prism pitch.

Using a-cylindrical lenses and/or varying the lens/prism configuration of cylindrical lens/prism pairs or a-cylindrical lens/prism pairs as a function of position alters the angular distribution of light exiting the optical film. For example, in display applications, the angular output distribution of light can serve to aim the light more toward the left eye position or more toward the right eye position. Using these optical films, light output distributions may be achieved that provide a sharper stereo edge and reduce the amount of cross talk between the left eye image and the right eye image. With reference to Example 1 below, the concepts of stereo edge and cross talk between left and right eye images may be further understood by considering the simulated light output distributions that would be perceived by a viewer positioned above the center of a display.

EXAMPLE 1

A display with an optical film having cylindrical lenses and varying prism pitch was simulated using ray tracing. The ray tracing software used was TracePro, a non-sequential ray tracing package (Lambda Research Corporation, Littleton, Mass.).

Display characteristics: WVGA (800×480 pixels); 196.8 mm (width)×118.08 mm (height); Viewing distance 750 mm, implying that the nominal eye separation of the viewer is +/−2.4 degrees.

Figure 7A:
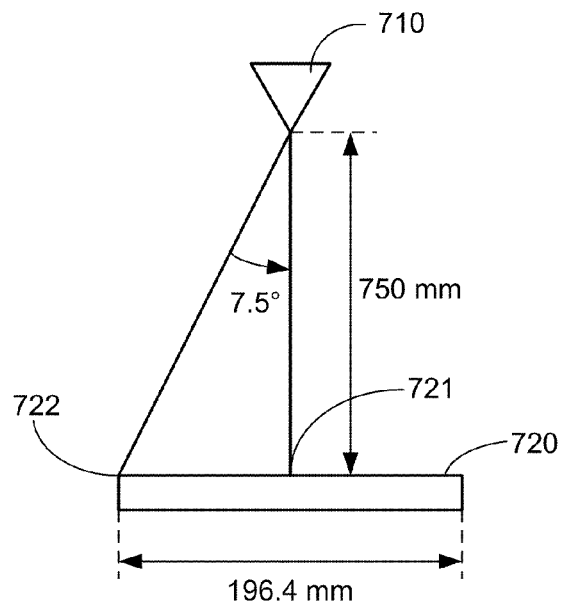
FIG. 7A illustrates the configuration of the display used for Examples 1-3.

As illustrated in FIG. 7A, for viewer positioned at 710, the left edge 722 of the display 720 is at an angle of 7.5 degrees from normal, assuming a display width of 196.4 mm and a viewing position of 750 mm above the display 720.

Figure 7B:
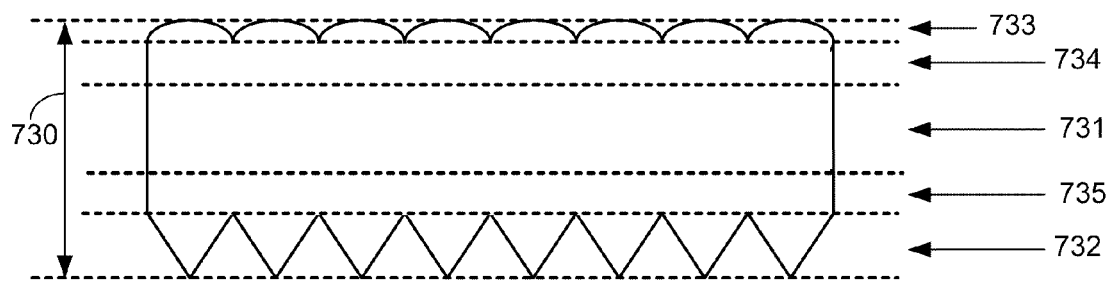
FIG. 7B is a cross section illustrating the thicknesses of various sections (caliper budget) of the optical films used for Examples 1-3.

Optical film characteristics: Two sided optical film with cylindrical lenses on one surface and prisms on the opposing surface. Cylindrical lens radius of 36.3 microns; Cylindrical lens pitch of 52.0000 microns; Prism pitch of 52.0051 microns. FIG. 7B is a cross section showing various thicknesses of a two sided optical film (referred to as the caliper budget): Overall optical film thickness 730, $t_t$=114 microns; Substrate thickness 731=50.8 microns; Prism thickness 732=45.0333 microns; Lens thickness 733=10.9787 microns; Total land thickness (lens land thickness 734 plus prism land thickness 735)=7.18798 microns.

Light output distributions for the optical film were simulated as would be perceived at the viewer's position 710 (see FIG. 7A) including the following: 1) the angular output distributions of light coming from the center 721 of the display (0 degrees from normal) for left and right eye image light sources, and 2) the angular output distribution of light coming from the edge 722 of the display (7.5 degrees from normal) for left and right eye image light sources.

Figure 8A:
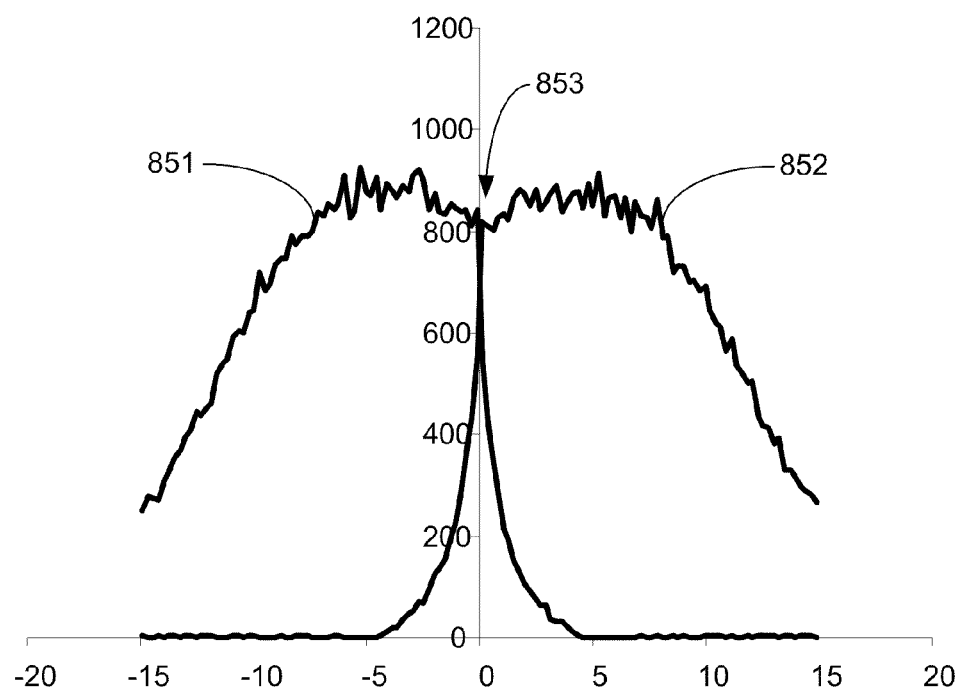
FIG. 8A shows graphs of the angular output distributions of the light from the left eye image light source and the right eye image light source at 0 degrees for the display simulated in Example 1.

FIG. 8A illustrates simulated angular output distributions at 0 degrees (center of the display). Distribution 851 is the light output distribution when the left eye image light source is on and the right eye image light source is off. Distribution 852 is the light output distribution when the right eye image light source is on and the left eye image light source is off. The stereo edge for distributions 851 and 852 is the intersection 853 at 0 degrees between the distributions 851, 852. FIG. 8A shows that at 0 degrees the slopes of the angular distributions 851 and 852 are non-zero and there is a region of overlap between distributions 851 and 852, resulting in a crosstalk contribution from the left eye image to the right eye image and vice versa.

The crosstalk may be measured at the location of the viewer's left or right eye (−/+2.4 degrees from the center of the display for a typical viewer and the display parameters listed above). As indicated in FIG. 7A, for the viewer's right eye (at 2.4 degrees), the amount of crosstalk is the ratio of the undesired light (left eye image output 851) to the desired light (right eye image output 852). For distributions 851 and 852 crosstalk at 2.4 degrees is about 9%.

Figure 8B:
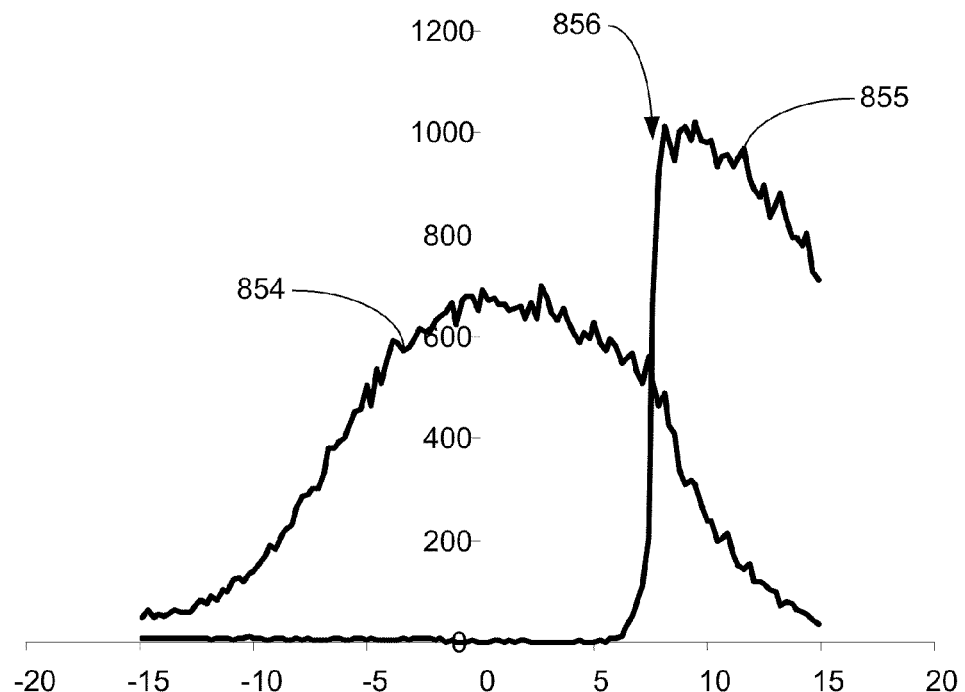
FIG. 8B shows graphs of angular output distributions of the light from the left eye image light source and the right eye image light source at 7.5 degrees for the display simulated in Example 1.

FIG. 8B illustrates simulated angular output distributions at 7.5 degrees (from the left edge of the display). Distribution 854 is the light output distribution when the left eye image light source is on and the right eye image light source is off. Distribution 855 is the light output distribution when the right eye image light source is on and the left eye image light source is off. The stereo edge for distributions 854 and 855 is the intersection 856 at 7.5 degrees between the distributions 854, 855. FIG. 8B shows that at the stereo edge 856, the slopes of the angular distributions 854, 855 are non-zero and there is a region of overlap between distributions 854 and 855, resulting in a crosstalk contribution of about 27% from the left eye image to the right eye image and vice versa.

The crosstalk between distributions 854 and 855 may be measured at the location of the viewer's right eye 9.9 degrees from the center of the display for a typical viewer and the display parameters listed above). As indicated in FIG. 8B, for the viewer's right eye, the amount of crosstalk is the ratio of the left eye image output to the right eye image output. For distributions 854 and 855, crosstalk at 9.9 degrees is about 27%.

EXAMPLE 2

A display with an optical film having a-cylindrical lenses and varying prism pitch was simulated by ray tracing using TracePro. The display characteristics were the same as listed in Example 1 and are repeated below for reading convenience:

Display characteristics: WVGA (800×480 pixels); 196.8 mm (width)×118.08 mm (height); Viewing distance 750 mm, implying that the nominal eye separation of the viewer is +/−2.4 degrees. As illustrated in FIG. 7A, for viewer 710, the edge 722 of the display 720 is at an angle of 7.5 degrees from normal, assuming a display width of 196.4 mm and a viewing position of 750 mm above the display 720.

Optical film characteristics: A two sided optical film having a-cylindrical prisms on one surface and prisms on the opposing surface. The a-cylindrical lenses were designed for a stigmatic focus for this system. The lens had a varying radius of curvature, but at its vertex, the radius of curvature is 36.3 microns (the same as the cylindrical lenses tested in Example 1). The lens pitch is 52.0000 microns. Prism pitch of 52.0050 microns was used to achieve a 7.5 degrees from normal crossing angle at the edge of the display; Caliper budget: (see FIG. 7B) Overall optical film thickness 730, $t_t$=114 microns; Substrate thickness 731=50.8 microns; Prism thickness 732=45.0333 microns; Lens thickness 733=10.9787 microns; Total land thickness (lens land thickness 734 plus prism land thickness 735)=8.05194 microns.

FIG. 9A compares the profile 980 of an a-cylindrical lens used in Example 2 to the profile 990 of a cylindrical lens having the same radius of curvature (36.3 microns) at the vertex.

Light output distributions were simulated as would be perceived at the viewer's position 710 (see FIG. 7A), including: 1) the angular output distribution of light coming from the center 721 of the display (0 degrees from normal) for left and right eye image light sources, and 2) the angular output distribution of light coming from the edge 722 of the display (7.5 degrees from normal as shown in FIG. 7A), for left and right eye image light sources.

Figure 9B:
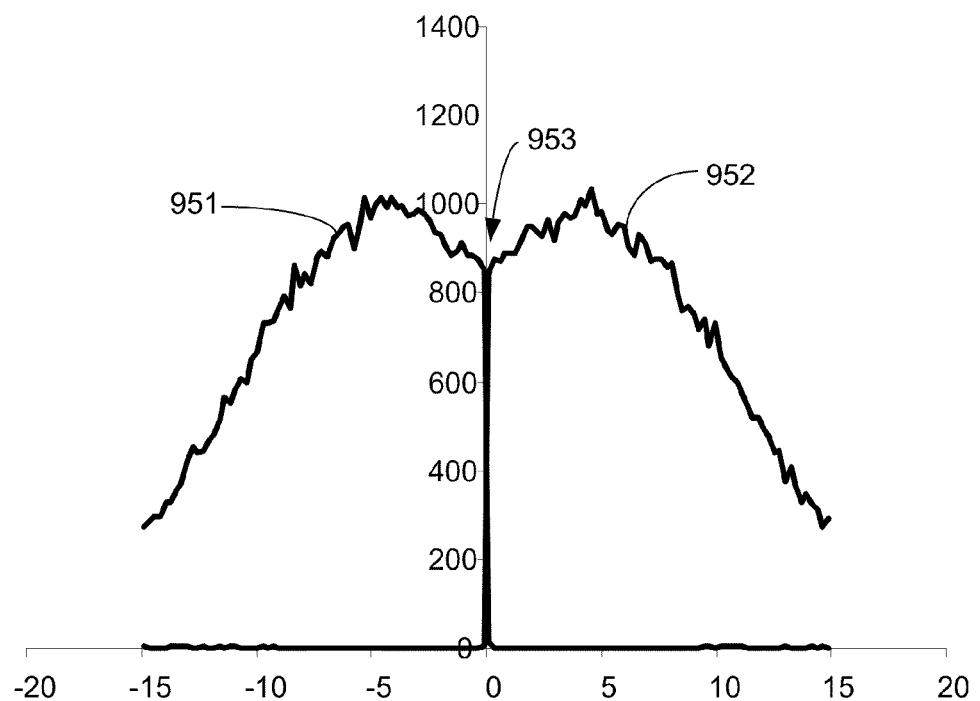
FIG. 9B shows graphs of the angular output distributions of the light from the left eye image light source and the right eye image light source at 0 degrees for the display simulated in Example 2.

FIG. 9B illustrates simulated angular output distributions at 0 degrees (center of the display). Distribution 951 is the light output distribution when the left eye image light source is on and the right eye image light source is off. Distribution 952 is the light output distribution when the right eye image light source is on and the left eye image light source is off. The stereo edge for distributions 951 and 952 is the intersection 953 at 0 degrees between the distributions 951, 952. FIG. 9B shows that at 0 degrees the slopes of the angular distributions 951 and 952 are much sharper (slope closer to infinity) than the distributions of 851 and 852 (FIG. 8A) at the stereo edge 853. Distributions 951 and 952 have a very small area of overlap at 0 degrees, resulting in a minimal crosstalk contribution from the left eye image to the right eye image and vice versa. For distributions 951 and 952, crosstalk at 2.4 degrees (the location of the viewer's right eye) is close to 0%

Figure 9C:
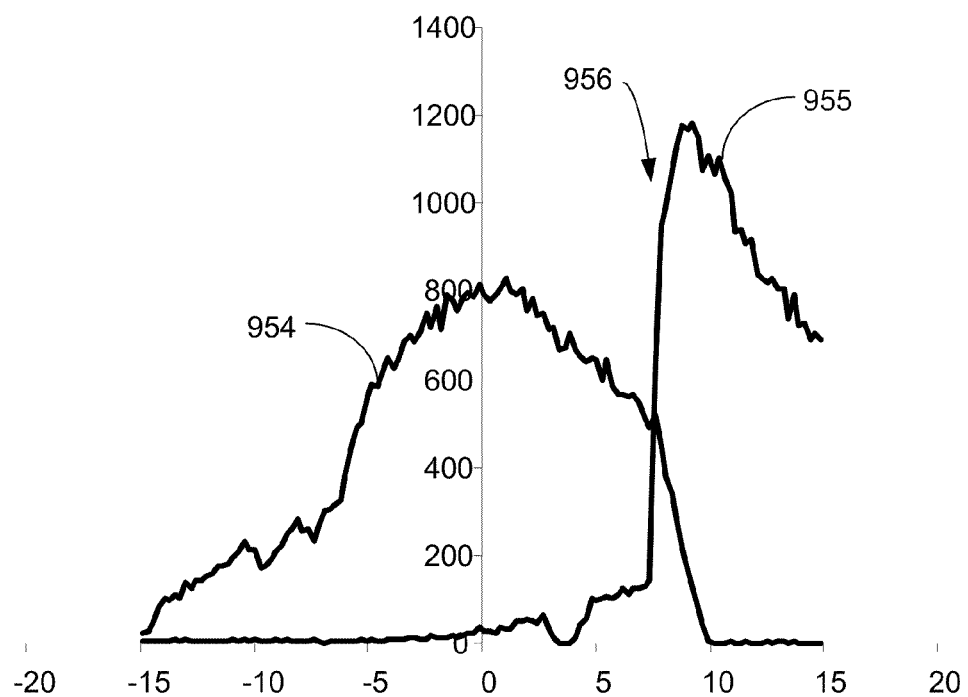
FIG. 9C shows graphs of angular output distributions of the light from the left eye image light source and the right eye image light source at 7.5 degrees for the display simulated in Example 2.

FIG. 9C illustrates simulated angular output distributions at 7.5 degrees (from the left edge 722 of the display as shown in FIG. 7A). Distribution 954 is the light output distribution when the left eye image light source is on and the right eye image light source is off. Distribution 955 is the light output distribution when the right eye image light source is on and the left eye image light source is off. The stereo edge for distributions 954 and 955 is the intersection 956 at 7.5 degrees between the distributions 954, 955. FIG. 7C shows that at the stereo edge 956, the slopes of the angular distributions 954, 955 are non-zero and there is a region of overlap between distributions 954 and 955, resulting in a crosstalk contribution from the left eye image to the right eye image and vice versa. For distributions 954 and 955, crosstalk at 9.9 degrees (the location of the viewer's right eye) is close to 3%.

EXAMPLE 3

A display with an optical film having rotated a-cylindrical lenses and constant prism pitch was simulated by ray tracing using TracePro. The display characteristics were the same as listed in Example 1 and are repeated below for reading convenience:

Display characteristics: WVGA (800×480 pixels); 196.8 mm (width)×118.08 mm (height); Viewing distance 750 mm, implying that the nominal eye separation of the viewer is +/−2.4 degrees. As illustrated in FIG. 7A, for viewer 710, the edge 722 of the display 720 is at an angle of 7.5 degrees from normal, assuming a display width of 196.4 mm and a viewing position of 750 mm above the display 720.

Optical film characteristics: A two sided optical film having a-cylindrical prisms on one surface and prisms on the opposing surface. The a-cylindrical lenses were designed for a stigmatic focus for this system. The lenses had a varying radius of curvature, but at its vertex, the radius of curvature is 36.3 microns (the same as the a-cylindrical lenses tested in Example 2). The lens pitch was 52.0000 microns and the prism pitch was 52.0000 microns, the same as the lens pitch. Each lens was rotated towards the center of the display in a gradually increasing fashion starting with no rotation at the display center and progressing to 7.5 degrees of rotation at the display edge to achieve a 7.5 degrees from normal crossing angle at the edge of the display. Rotation was at a point about 114 microns below the a-cylindrical lens vertex and on the a-cylindrical lens center line. The rotation varies linearly from the pattern center outward from 0 degrees to 7.5 degrees at the display edge. The vertex of each a-cylindrical lens points toward the center of the display. Caliper budget: (see FIG. 7B) Overall optical film thickness 730, $t_t$=114 microns; Substrate thickness 731=50.8 microns; Prism thickness 732=45.0333 microns; Lens thickness 733=10.1147 microns; Total land thickness (lens land thickness 734 plus prism land thickness 735)=8.05194 microns.

Light output distributions were simulated as would be perceived at the viewer's position 710 (see FIG. 7A), including: 1) the angular output distribution of light coming from the center 721 of the display (0 degrees from normal) for left and right eye image light sources, and 2) the angular output distribution of light coming from the left edge 722 of the display (7.5 degrees from normal) for left and right eye image light sources.

Figure 10A:
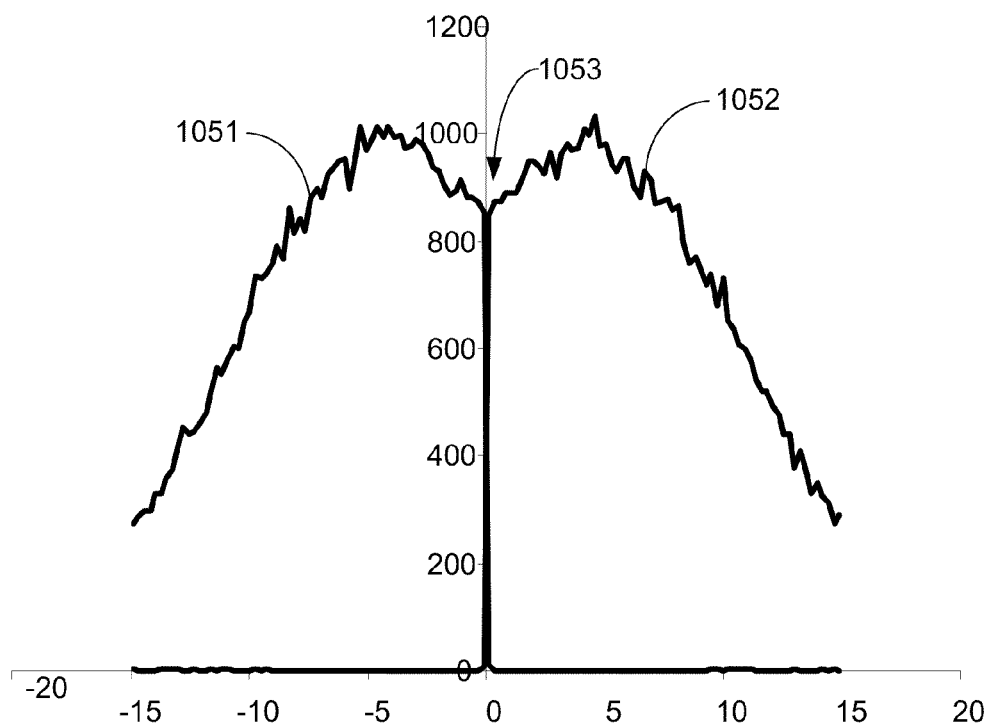
FIG. 10A shows graphs of the angular output distributions of the light from the left eye image light source and the right eye image light source at 0 degrees for the display simulated in Example 3.

FIG. 10A illustrates simulated angular output distributions at 0 degrees (center of the display). Distribution 1051 is the light output distribution when the left eye image light source is on and the right eye image light source is off. Distribution 1052 is the light output distribution when the right eye image light source is on and the left eye image light source is off. The stereo edge for distributions 1051 and 1052 is the intersection 1053 at 0 degrees between the distributions 1051, 1052. FIG. 10A shows that at 0 degrees the slopes of the angular distributions 1051 and 1052 are the same as the distributions of 951 and 952 (FIG. 9B). Distributions 1051 and 1052 have virtually no area of overlap at 0 degrees, resulting in a crosstalk contribution from the left eye image to the right eye image and vice versa that is virtually zero. For distributions 1051 and 1052, crosstalk at 2.4 degrees (the location of the viewer's right eye) is 0%.

Figure 10B:
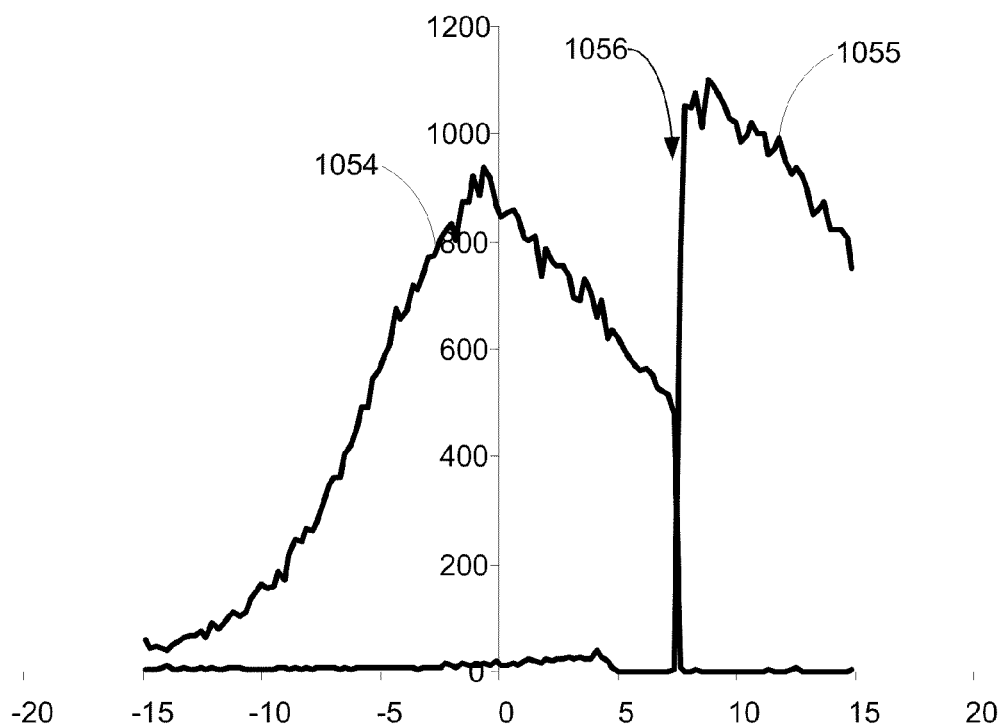
FIG. 10B shows graphs of angular output distributions of the light from the left eye image light source and the right eye image light source at 7.5 degrees for the display simulated in Example 3.

FIG. 10B illustrates simulated angular output distributions at 7.5 degrees (from the left edge 722 of the display). Distribution 1054 is the light output distribution when the left eye image light source is on and the right eye image light source is off. Distribution 1055 is the light output distribution when the right eye image light source is on and the left eye image light source is off. The stereo edge 1056 for distributions 1054 and 1055 is the intersection at 7.5 degrees between the distributions 1054, 1055. FIG. 10B shows that at the stereo edge 1056, the slopes of the angular distributions 1054, 1055 are also very close to nearly vertical, resulting in very low crosstalk contribution close to 0% from the left eye image to the right eye image and vice versa.

Some of the autostereoscopic displays described herein include double sided optical films having cylindrical or a-cylindrical lenses on one surface of the film. Each of the lenses is registered to a corresponding prism on the opposing surface of the film. In some examples, the pitch of the prisms is the same as the pitch of the lenses. In other examples, the pitch of the prisms is the different from the pitch of the lenses. The prisms may be contiguous or non-contiguous.

The lenses may be rotated with a rotation that varies with position on the optical film. If the film design is such that the focal length of the lens is the vertex of the corresponding prism, the angular location of the stereo edge will vary from zero degrees when the lens and prism are centered to both positive and negative angles as the prism vertex is de-centered with respect to the lens. This is similar to moving an object off of the optical axis in a conventional lens system. As the prism is increasingly de-centered with respect to its corresponding lens, however, it results in less than perfect focus for the lens. In optical films having rotated lenses, each lens may be rotated about its focal point, e.g. the apex of the corresponding prism. The light from the apex of the prism can be directed to a wide range of desired angles while preserving stigmatic focus.

The lenses and prisms for the 3D autostereoscopic films can be made using, for example, microreplication processes such as continuous cast and cure (3C). Examples of a 3C process are described in the following patents, all of which are incorporated herein by reference as if fully set forth: U.S. Pat. Nos. 4,374,077; 4,576,850; 5,175,030; 5,271,968; 5,558,740; and 5,995,690. Creating the master tool for rotated lenses also requires precise synchronization of the rotation of the diamond cutting tip with the horizontal position on the master tool. The features on the film can also be made by techniques other than the 3C technique discussed above, such as compression molding, injection molding, extrusion and two pass coating as for example in U.S. Pat. No. 7,530,721 which is incorporated herein by reference.

The lenses can be registered with the prisms in the optical film using methods to make optical films having microreplicated registered patterns on opposed surfaces as described in U.S. Pat. Nos. 7,165,959 and 7,224,529, both of which are incorporated herein by reference as if fully set forth. The liquid from which the microreplicated structures are created is typically a curable photopolymerizable material, such as acrylates curable by UV light. Other coating materials can be used, for example a polymerizable material, and selection of a material may depend upon the particular characteristics desired for the microreplicated structures. Examples of curing methods for use in the process include reactive curing, thermal curing, or radiation curing.

What is claimed is:

1. A double sided optical film, comprising:
   a-cylindrical lenses disposed on a first surface of the optical film; and
   prisms disposed on a second surface of the optical film, wherein each lens on the first surface is registered to a prism on the second surface;
   wherein the prisms and the a-cylindrical lenses each extend parallel to a longitudinal axis; and
   wherein each of the a-cylindrical lenses is characterized by a rotation angle, the rotation angles being different at different positions on the first surface.

2. The optical film of claim 1, wherein the prisms are contiguous.

3. The optical film of claim 1, wherein the prisms are non-contiguous.

4. The optical film of claim 1, wherein the prisms have a pitch that is different from a pitch of the lenses.

5. The optical film of claim 1, wherein the prisms have a pitch that is substantially the same as a pitch of the lenses.

6. The optical film of claim 1, wherein the a-cylindrical lenses comprise:
   positively rotated a-cylindrical lenses, each positively rotated a-cylindrical lens rotated at a positive angle with respect to a center line of the positively rotated a-cylindrical lens; and
   negatively rotated a-cylindrical lenses, each negatively rotated a-cylindrical lens rotated at a negative angle with respect to a center line of the negatively rotated a-cylindrical lens.

7. The optical film of claim 1, wherein, for each a-cylindrical lens having a non-zero rotation angle, the rotation of each rotated a-cylindrical lens is about a rotation point below a vertex of the a-cylindrical lens and on a center line of the rotated a-cylindrical lens.

8. The optical film of claim 7, wherein the rotation point is the focal point of the lens.

9. An autostereoscopic display module, comprising:
   a light guide having a first side, a second side opposite the first side, a first light guide surface extending between the first and second sides, and a second light guide surface opposite the first surface, wherein the first light guide surface substantially re-directs light and the second light guide surface substantially emits light;
   a first light source disposed along the first side of the light guide;

a second light source disposed along the second side the light guide;

a synchronization driving element electrically coupled to the first and second light sources, the synchronization driving element configured to synchronize turning each of the first or second light sources on or off in an alternating order;

a double sided optical film arranged to receive light emitted through the second light guide surface, the optical film comprising:
- a-cylindrical lenses disposed on a first surface of the optical film; and
- prisms disposed on a second surface of the optical film, the second surface of the optical film oriented toward the light guide, wherein each lens on the first surface of the optical film is registered to a prism on the second surface of the optical film;

wherein the prisms and the a-cylindrical lenses each extend parallel to a longitudinal axis; and wherein each of the a-cylindrical lenses is characterized by a rotation angle, the rotation angles being different at different positions on the first surface.

10. The display module of claim 9, wherein the prisms are contiguous.

11. The display module of claim 9, wherein the prisms are non-contiguous.

12. The display module of claim 9, wherein the prisms have a pitch that is different from a pitch of the lenses.

13. The display module of claim 9 wherein the prisms have a pitch that is substantially the same as a pitch of the lenses.

14. The display module of claim 9, wherein, for each a-cylindrical lens having a non-zero rotation angle, the rotation of each a-cylindrical lens is about a point below a vertex of the a-cylindrical lens and on a center line of the a-cylindrical lens.

15. The display module of claim 9, wherein the a-cylindrical lenses comprise:
- first lenses rotated at positive angles with respect to their center lines and toward an estimated viewer position; and
- second lenses rotated at negative angles with respect to their center lines and toward the estimated viewer position.

* * * * *